(12) United States Patent
Yamazaki et al.

(10) Patent No.: US 12,523,003 B2
(45) Date of Patent: Jan. 13, 2026

(54) SYSTEM AND METHOD FOR CONTROLLING WORK MACHINE, AND WORK MACHINE

(71) Applicant: KOMATSU LTD., Tokyo (JP)

(72) Inventors: Yusuke Yamazaki, Tokyo (JP); Tomoki Andou, Tokyo (JP); Souichi Tsumura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 369 days.

(21) Appl. No.: 18/250,832

(22) PCT Filed: Dec. 24, 2021

(86) PCT No.: PCT/JP2021/048372
§ 371 (c)(1),
(2) Date: Apr. 27, 2023

(87) PCT Pub. No.: WO2022/163272
PCT Pub. Date: Aug. 4, 2022

(65) Prior Publication Data
US 2023/0383495 A1    Nov. 30, 2023

(30) Foreign Application Priority Data

Feb. 1, 2021  (JP) ................................ 2021-014571

(51) Int. Cl.
*E02F 3/84* (2006.01)
*E02F 9/26* (2006.01)
(52) U.S. Cl.
CPC .............. *E02F 3/841* (2013.01); *E02F 9/262* (2013.01)
(58) Field of Classification Search
None
See application file for complete search history.

(56) References Cited

U.S. PATENT DOCUMENTS

2016/0076223 A1   3/2016  Wei et al.
2019/0218747 A1*  7/2019  Hashimoto .......... G05D 1/0212
(Continued)

FOREIGN PATENT DOCUMENTS

CA    3 063 366 A1   12/2019
CA    3 063 687 A1   12/2019
(Continued)

OTHER PUBLICATIONS

The Office Action for the corresponding Canadian application No. 3,200,424 issued on Sep. 13, 2024.
(Continued)

*Primary Examiner* — Lail A Kleinman
(74) *Attorney, Agent, or Firm* — GLOBAL IP COUNSELORS, LLP

(57) ABSTRACT

A system controls a work machine including a work implement. The system includes a sensor and a controller. The controller acquires current position data of the work machine, acquires actual topography data, acquire default target displacement data that defines a target displacement according to a movement amount of the work machine, acquires a work interval indicative of a distance between a previous start position of work by the work machine and a current start position behind the previous start position, generates modified data with the default target displacement data modified according to the work interval, refers to the modified data to determine the target displacement according to the movement amount of the work machine from the current start position, determines topography data with the actual topography data vertically displaced downward by the target displacement as a target profile, and moves the work implement according to the target profile.

16 Claims, 18 Drawing Sheets

(56) References Cited

U.S. PATENT DOCUMENTS

| | | | |
|---|---|---|---|
| 2020/0157773 A1 | 5/2020 | Takaoka et al. |
| 2020/0370281 A1 | 11/2020 | Takaoka et al. |
| 2020/0407950 A1 | 12/2020 | Takaoka et al. |
| 2021/0324604 A1 | 10/2021 | Sawamura et al. |

FOREIGN PATENT DOCUMENTS

| | | |
|---|---|---|
| JP | 2019-105120 A | 6/2019 |
| JP | 2019-173470 A | 10/2019 |
| JP | 2019-214868 A | 12/2019 |
| JP | 2020-33789 A | 3/2020 |
| WO | 2018/179383 A1 | 10/2018 |

OTHER PUBLICATIONS

The International Search Report for the corresponding international application No. PCT/JP2021/048372, issued on Mar. 15, 2022.

\* cited by examiner

SYSTEM AND METHOD FOR CONTROLLING WORK MACHINE, AND WORK MACHINE

CROSS-REFERENCE TO RELATED APPLICATIONS

This application is a U.S. National stage application of International Application No. PCT/JP2021/048372, filed on Dec. 24, 2021. This U.S. National stage application claims priority under 35 U.S.C. § 119(a) to Japanese Patent Application No. 2021-014571, filed in Japan on Feb. 1, 2021, the entire contents of which are hereby incorporated herein by reference.

BACKGROUND

Technical Field

The present invention relates to a system and a method for controlling a work machine, and a work machine.

Background Information

A control for automatically adjusting a position of a work implement such as a blade has been conventionally proposed for work machines such as bulldozers, graders, or the like. For example, in International Publication No. WO2018/179383, a controller acquires actual topography data indicative of an actual topography. The controller determines a topography in which the actual topography is vertically displaced by a target displacement as a target profile. The controller operates a work implement according to the target profile. Thus, the actual topography is formed into a shape according to the target profile.

SUMMARY

The work machine travels forward, starts work with the work implement from a predetermined start position, and operates the work implement according to the target profile. Then, upon reaching a predetermined end position, the work machine travels in reverse to a next start position. In this way, the work machine performs work in one work path. The work path means a series of work steps from the predetermined start position to the predetermined end position.

As described above, in a case where the topography in which the actual topography is vertically displaced by the target displacement is determined as the target profile, the target profile is affected by the actual topography. In a case where the target profile for the next work path is determined repeatedly along the previous work path, the target profile for the next work path is affected by the actual topography resulting from the previous work path. Therefore, the actual topography resulting from the previous work path may result in steep inclinations or unevenness in the target profile for the next work path. In that case, work quality or work efficiency will suffer. For example, if a cutting angle suddenly increases, a load applied to the work implement will suddenly increase, causing a reduction in work efficiency. Moreover, if the work implement is controlled along the target profile including a lot of unevenness, the finish topography will also include a lot of unevenness, resulting in a reduction in quality. An object of the present disclosure is to reduce an influence of the topography resulting from the previous work path and improve work quality or work efficiency in the next work path under the automatic control of the work machine.

A system according to a first aspect of the present disclosure is a system for controlling a work machine including a work implement. The system according to the present aspect includes a sensor and a controller. The sensor detects a current position of the work machine. The controller communicates with the sensor. The controller is programmed to execute the following processes. The controller acquires current position data indicative of the current position of the work machine. The controller acquires actual topography data indicative of an actual topography. The controller acquires default target displacement data. The default target displacement data defines a target displacement according to a movement amount of the work machine. The controller acquires a work interval. The work interval indicates a distance between a previous start position of work by the work machine and a current start position positioned behind the previous start position. The controller generates modified data in which the default target displacement data is modified according to the work interval. The controller refers to the modified data to determine the target displacement according to the movement amount of the work machine from the current start position. The controller determines topography data in which the actual topography is vertically displaced downward by the target displacement as a target profile. The controller moves the work implement according to the target profile.

A method according to a second aspect of the present disclosure is a method for controlling a work machine including a work implement. The method according to the present aspect includes the following processes. A first process is to acquire current position data indicative of a current position of the work machine. A second process is to acquire actual topography data indicative of an actual topography. A third process is to acquire default target displacement data. The default target displacement data defines a target displacement according to a movement amount of the work machine. A fourth process is to acquire a work interval. The work interval indicates a distance between a previous start position of work by the work machine and a current start position positioned behind the previous start position. A fifth process is to generate modified data in which the default target displacement data is modified according to the work interval. A sixth process is to refer to the modified data to determine the target displacement according to the movement amount of the work machine from the current start position. A seventh process is to determine topography data in which the actual topography data is vertically displaced downward by the target displacement as a target profile. An eighth process is to move the work implement according to the target profile. The order in which each process is executed is not limited to the aforementioned order and may be changed. A work machine according to a third aspect of the present disclosure includes a work implement, a sensor, and a controller. The sensor detects a current position of the work machine. The controller communicates with the sensor. The controller is programmed to execute the following processes. The controller acquires current position data indicative of the current position of the work machine. The controller acquires actual topography data indicative of an actual topography. The controller acquires default target displacement data. The default target displacement data defines a target displacement according to a movement amount of the work machine. The controller acquires a work interval. The work interval indicates a distance between a previous start position of work by the work machine and a current start position positioned behind the previous start position. The controller generates modified data in which the default target displacement data is modified according to the work interval. The controller refers to the modified data to determine the target displacement according to the movement amount of the work machine from the current start position. The controller determines topography data in which the actual topography data is vertically displaced downward by the target displacement as a target profile. The controller moves the work implement according to the target profile.

According to the present disclosure, the modified data is generated in which the default target displacement data is modified according to the distance between the previous start position and the current start position. Then, the target displacement is determined with reference to the modified data, and the topography data in which the actual topography data is vertically displaced downward by the target displacement is determined as the target profile. Therefore, the target profile for the current work path is determined in consideration of the topography resulting from the previous work path. As a result, it is possible to reduce the influence of the topography resulting from the previous work path and improve work quality or work efficiency.

DETAILED DESCRIPTION OF EMBODIMENT(S)

Figure 1:
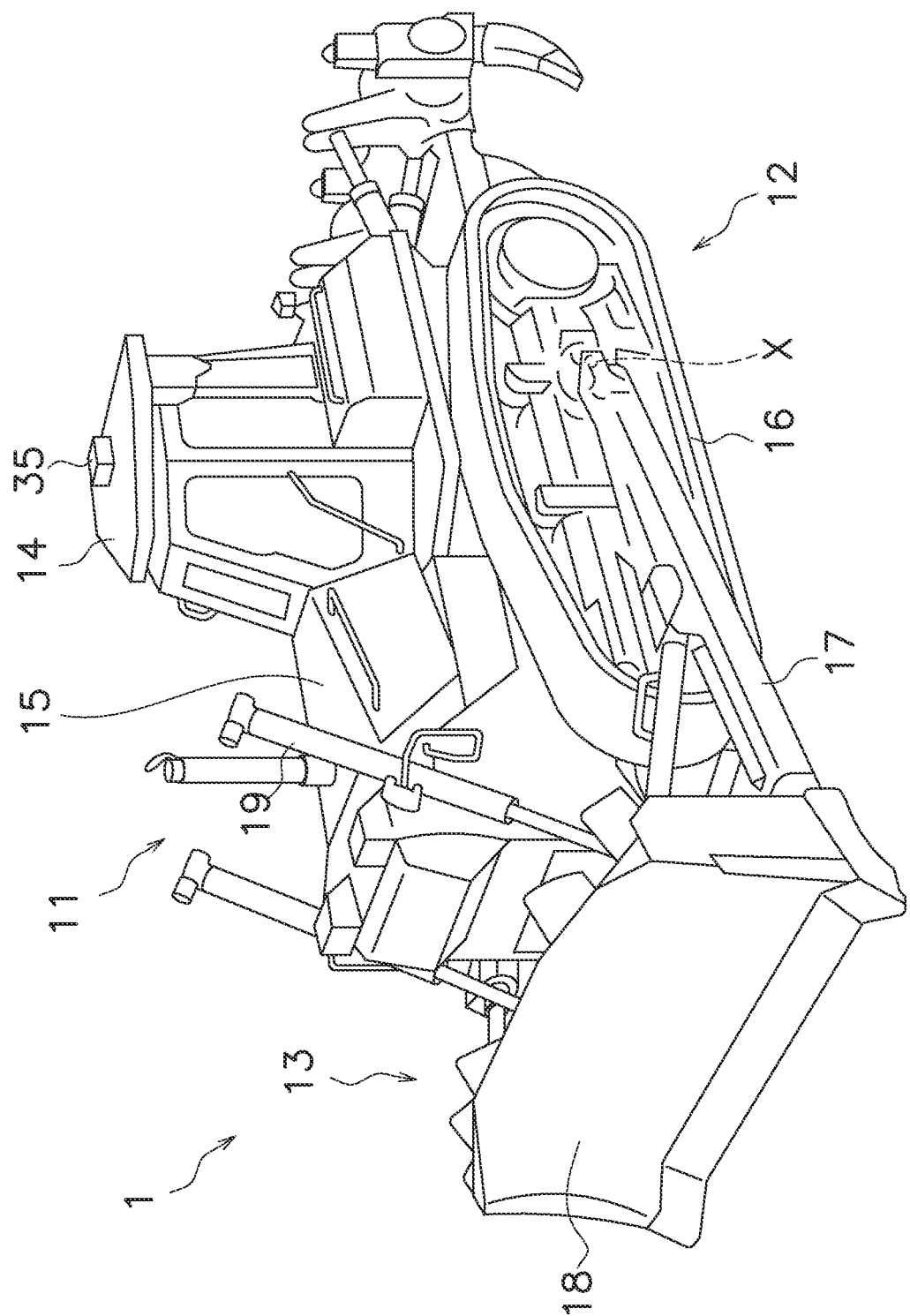
FIG. 1 is a side view of a work machine according to an embodiment.

A work machine according to an embodiment will be described below with reference to the drawings. FIG. 1 is a side view of a work machine 1 according to the embodiment. The work machine 1 according to the present embodiment is a bulldozer. The work machine 1 includes a vehicle body 11, a travel device 12, and a work implement 13.

The vehicle body 11 includes an operating cabin 14 and an engine compartment 15. A driver's seat that is not illustrated is disposed in the operating cabin 14. The engine compartment 15 is disposed in front of the operating cabin 14. The travel device 12 is attached to a lower portion of the vehicle body 11. The travel device 12 includes a pair of left and right crawler belts 16. Only the left crawler belt 16 is illustrated in FIG. 1. The work machine 1 travels due to the rotation of the crawler belt 16. The travel of the work machine 1 may be either autonomous travel, semi-autonomous travel, or travel under operation by an operator.

The work implement 13 is attached to the vehicle body 11 and the travel device 12. The work implement 13 includes a lift frame 17, a blade 18, and a lift cylinder 19. A trunnion (cylindrical protrusion) is disposed on each of the left and right sides of the travel device 12 around an axis X extending in the vehicle width direction. The lift frame 17 is attached to the travel device 12 via the trunnions so as to be movable up and down. The lift frame 17 supports the blade 18. The blade 18 is disposed in front of the vehicle body 11. The blade 18 moves up and down accompanying the up and down movements of the lift frame 17. The lift cylinder 19 is coupled to the vehicle body 11 and the lift frame 17. Due to the extension and contraction of the lift cylinder 19, the lift frame 17 rotates up and down around the axis X. The lift cylinder 19 extends, causing the blade 18 to be raised. The lift cylinder 19 contracts, causing the blade 18 to be lowered.

Figure 2:
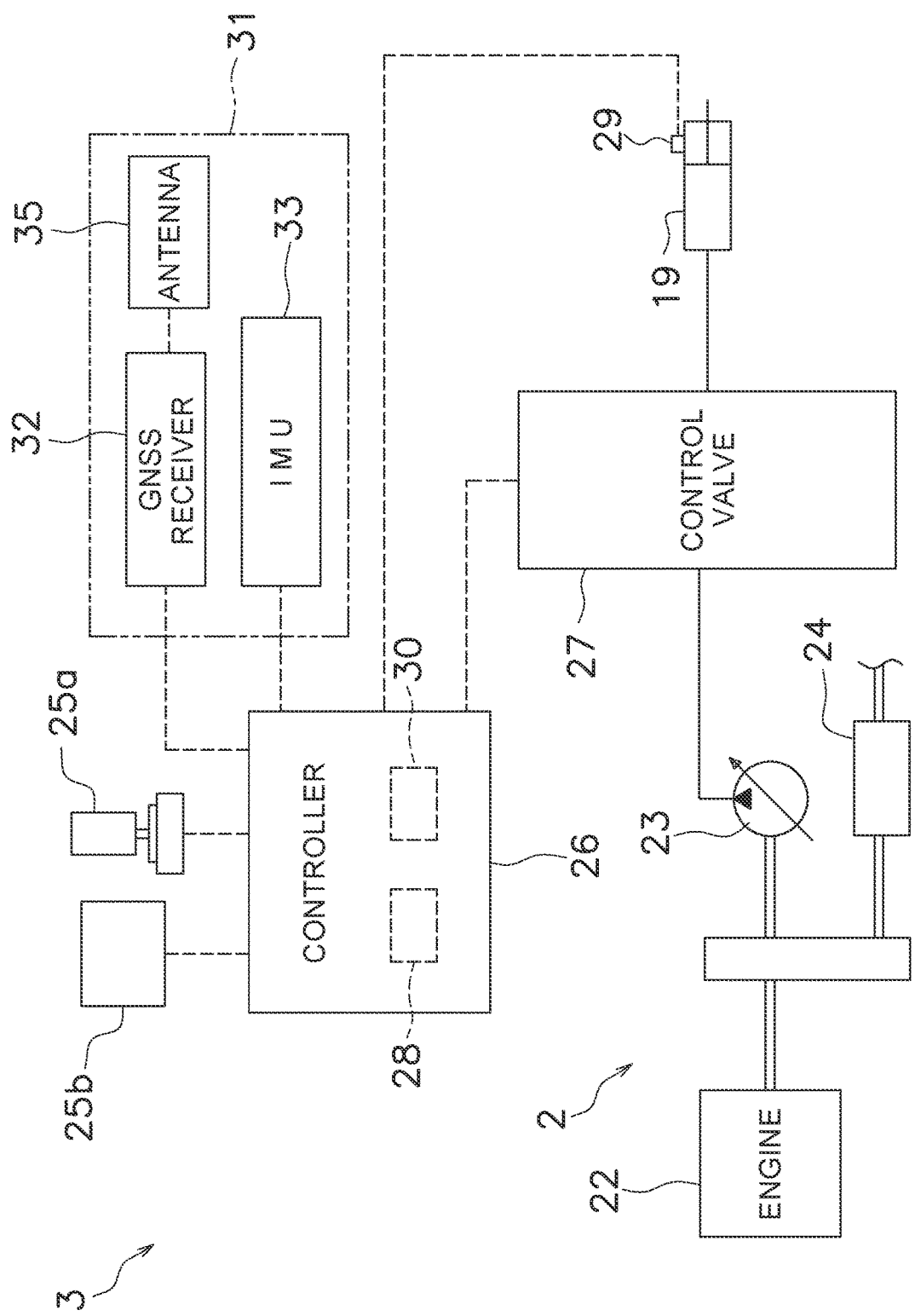
FIG. 2 is a block diagram illustrating a configuration of a drive system and a control system of the work machine.

FIG. 2 is a block diagram illustrating a configuration of a drive system 2 and a control system 3 of the work machine 1. As illustrated in FIG. 2, the drive system 2 includes an engine 22, a hydraulic pump 23, and a power transmission device 24. The hydraulic pump 23 is driven by the engine 22 to discharge hydraulic fluid. The hydraulic fluid discharged from the hydraulic pump 23 is supplied to the lift cylinder 19. Although one hydraulic pump 23 is illustrated in FIG. 2, a plurality of hydraulic pumps may be provided.

The power transmission device 24 transmits the driving force of the engine 22 to the travel device 12. The power transmission device 24 may be, for example, a hydro static transmission (HST). Alternatively, the power transmission device 24 may be, for example, a transmission including a torque converter or a plurality of transmission gears.

The control system 3 includes an operating device 25a, an input device 25b, a controller 26, a storage device 28, and a control valve 27. The operating device 25a is a device for operating the work implement 13 and the travel device 12. The operating device 25a is disposed in the operating cabin 14. The operating device 25a receives an operation by an operator for driving the work implement 13 and the travel device 12, and outputs an operation signal corresponding to the operation. The operating device 25a includes, for example, an operating lever, a pedal, a switch, and the like.

For example, the operating device 25a for traveling is configured to be operated in a forward position, a reverse position, and a neutral position. The operating device 25a for the work implement 13 is configured to be operated in a raising position and a lowering position. The operation signal indicative of a position of the operating device 25a is output to the controller 26. When the operating position of the operating device 25a is in the forward position, the controller 26 controls the travel device 12 or the power transmission device 24 so that the work machine 1 travels forward. When the operating position of the operating device 25a is in the reverse position, the controller 26 controls the travel device 12 or the power transmission device 24 so that the work machine 1 travels in reverse.

The input device 25b is, for example, a touch screen type input device. However, the input device 25b may be another input device such as a switch, or the like. The operator can input a setting for automatic control described later using the input device 25b.

The controller 26 is programmed to control the work machine 1 based on acquired data. The controller 26 includes the storage device 28 and a processor 30. The processor 30 includes, for example, a CPU. The storage device 28 includes, for example, a memory and an auxiliary storage device. The storage device 28 may be, for example, a RAM or a ROM. The storage device 28 may be a semiconductor memory, a hard disk, or the like. The storage device 28 is an example of a non-transitory computer-readable recording medium. The storage device 28 stores computer instructions that are executable by the processor 30 and for controlling the work machine 1.

The controller 26 acquires an operation signal from the operating device 25a. The controller 26 controls the control valve 27 based on the operation signal. The control valve 27 is a proportional control valve and is controlled by a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates the command signal to the control valve 27 so that the blade 18 operates according to the operation of the operating device 25a as described above. Thus, the lift cylinder 19 is controlled according to the operation amount of the operating device 25a.

For example, when the operating position of the operating device 25a is in the raising position, the controller 26 controls the control valve 27 so that the work implement 13 is raised. When the operating position of the operating device 25a is in the lowering position, the controller 26 controls the control valve 27 so that the work implement 13 is lowered. The control valve 27 may be a pressure proportional control valve. Alternatively, the control valve 27 may be an electromagnetic proportional control valve.

Figure 3:
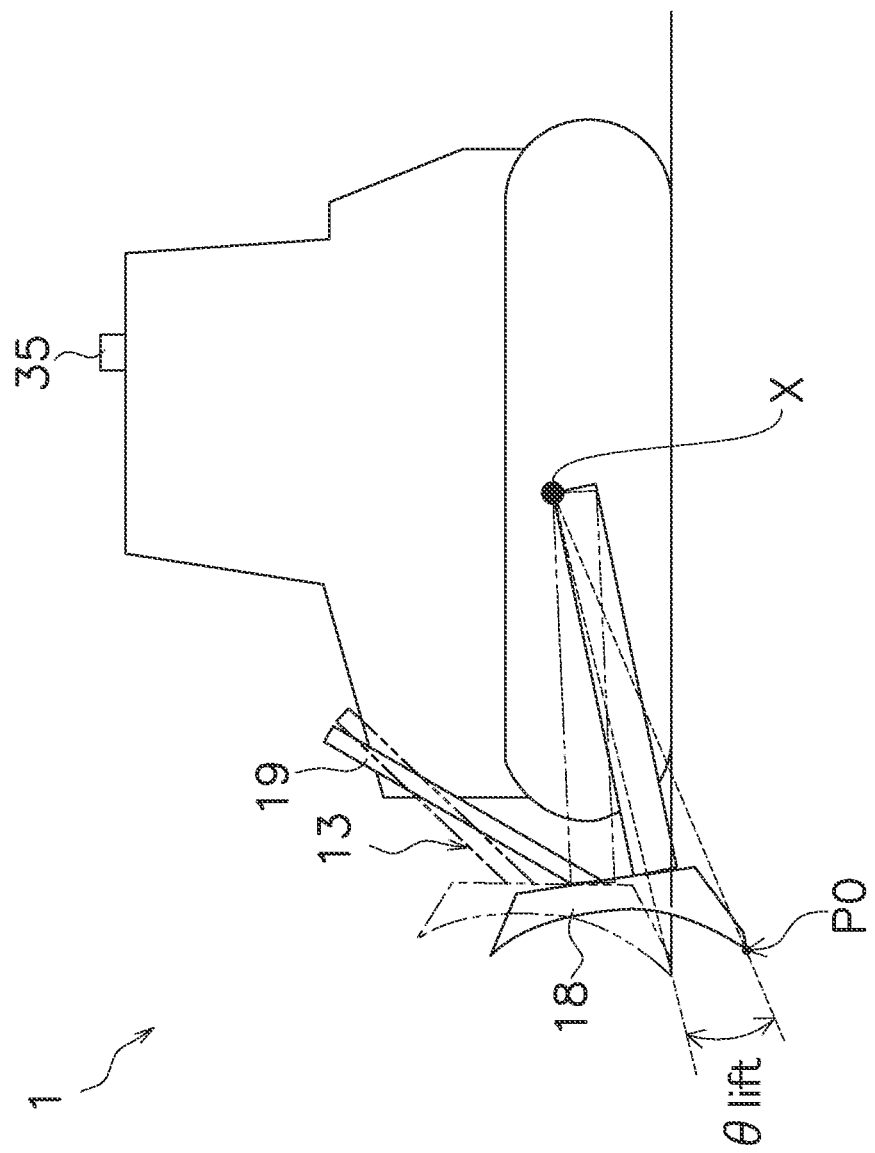
FIG. 3 is a schematic view illustrating a configuration of the work machine.

The control system 3 includes a stroke sensor 29. The stroke sensor 29 detects a stroke length of the lift cylinder 19 (hereinafter referred to as "lift cylinder length"). The controller 26 calculates a lift angle θ lift of the blade 18 based on the lift cylinder length. FIG. 3 is a schematic view illustrating a configuration of the work machine 1.

In FIG. 3, the origin position of the work implement 13 is indicated by a chain double-dashed line. The origin position of the work implement 13 is the position of the blade 18 in a state where a tip of the blade 18 is in contact with the ground surface on a horizontal ground surface. The lift angle θ lift is the angle, when the work machine 1 is viewed from the side, between a lower end of the blade 18 (blade tip position P0) at the origin position, the axis X, and a lower end of the blade 18 (blade tip position P0) when the blade is operated up and down.

As illustrated in FIG. 2, the control system 3 includes a position sensor 31. The position sensor 31 measures a position of the work machine 1. The position sensor 31 includes a global navigation satellite system (GNSS) receiver 32, an IMU 33, and an antenna 35. The GNSS receiver 32 is, for example, a receiver for global positioning system (GPS). The GNSS receiver 32 receives a positioning signal from a satellite, computes the position of the antenna 35 based on the positioning signal, and generates vehicle body position data. The controller 26 acquires the vehicle body position data from the GNSS receiver 32.

The IMU 33 is an inertial measurement unit. The IMU 33 acquires vehicle body tilt angle data and vehicle body acceleration data. The vehicle body tilt angle data includes an angle with respect to the horizontal in the vehicle longitudinal direction (pitch angle) and an angle with respect to the horizontal in the vehicle lateral direction (roll angle). The body acceleration data includes the acceleration of the work machine 1. The controller acquires the traveling direction and the vehicle speed of the work machine 1 from the vehicle body acceleration data. The controller 26 acquires the vehicle body tilt angle data and the vehicle body acceleration data from the IMU 33.

The controller 26 calculates a blade tip position P0 from the lift cylinder length, the vehicle body position data, and the vehicle body tilt angle data. The controller 26 calculates global coordinates of the antenna 35 based on the vehicle body position data. The controller 26 calculates the lift angle θ lift based on the lift cylinder length and vehicle body dimension data. The vehicle body dimension data is stored in the storage device 28 and includes data indicative of a position of the work implement 13 with respect to the axis X. The controller 26 calculates local coordinates of the blade tip position P0 with respect to the antenna 35 based on the lift angle θ lift and the vehicle body dimension data. The controller 26 calculates the traveling direction and the vehicle speed of the work machine 1 from the vehicle body acceleration data. The vehicle body dimension data includes data indicative of a position of the work implement 13 with respect to the antenna 35. The controller 26 calculates global coordinates of the blade tip position P0 based on the global coordinates of the antenna 35, the local coordinates of the blade tip position P0, and the vehicle body tilt angle data. The controller 26 acquires the global coordinates of the blade tip position P0 as blade tip position data.

The storage device 28 stores work site data and design topography data. The work site data indicates an actual topography of the work site. The work site data is, for example, an actual topography survey map in a three-dimensional data format. The work site data can be acquired, for example, by aerial laser survey. Alternatively, the work site data may be acquired based on a work result of the work machine that operates at the work site.

Figure 4:
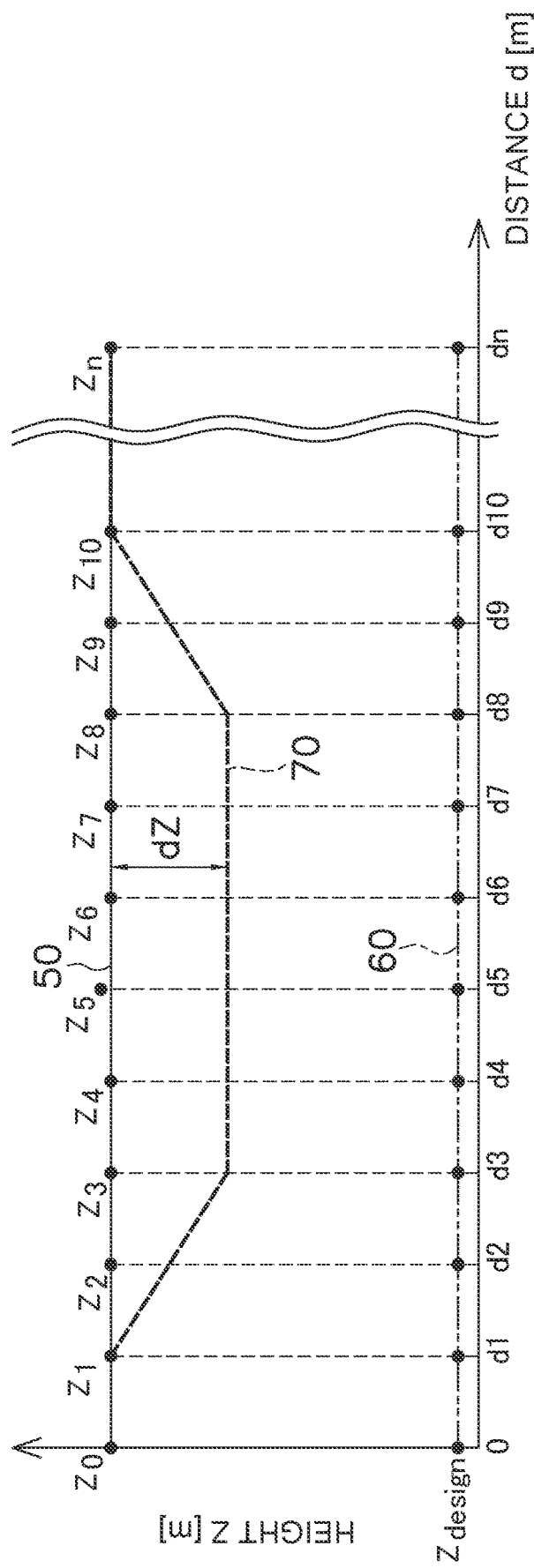
FIG. 4 is a graph illustrating an example of a final design topography, an actual topography, and a target profile.

The controller 26 acquires actual topography data. The actual topography data indicates an actual topography 50 of the work site. The actual topography data is information indicative of a topography positioned in the traveling direction of the work machine 1. The actual topography data may be acquired from the work site data. Alternatively, the actual topography data may be acquired based on the work result of a previous work path. The actual topography data may be acquired based on the position data of the work machine when the work machine travels in reverse after operating on the previous work path. FIG. 4 illustrates a cross-section of the actual topography 50. In FIG. 4, the vertical axis indicates the height of the topography and the horizontal axis indicates a distance from a current position of the work machine 1 in the traveling direction.

The actual topography data is acquired by computing with the controller 26 from the work site data, the position of the work machine 1 acquired from the aforementioned position sensor 31, and the traveling direction of the work machine 1. The actual topography data may be data acquired from the work site data, the position of the work machine 1 acquired from the position sensor 31, and the traveling direction of the work machine 1, with smoothing process applied.

Specifically, the actual topography data includes heights Z0 to Zn of the actual topography 50 at a plurality of reference points from a current position to a predetermined topography recognition distance do in the traveling direction of the work machine 1. In the present embodiment, the current position is a position determined based on the current blade tip position P0 of the work machine 1. The current position may be determined based on a current position of another portion of the work machine 1. The current position may be updated as appropriate according to the travel of the work machine. The plurality of reference points are aligned at a predetermined interval, for example, every one meter.

The design topography data indicates a final design topography 60. The final design topography 60 is a final target shape of a surface of the work site. The design topography data is acquired from a construction drawing in a three-dimensional data format, for example. As illustrated in FIG. 4, the design topography data includes a height Zdesign of the final design topography 60 at a plurality reference points in the travel direction of the work machine 1. The plurality of reference points indicate a plurality of points at a predetermined interval along the traveling direction of the work machine 1. In FIG. 4, the actual topography 50 and the final design topography 60 have a flat shape parallel to the horizontal direction, but may have a different shape.

Figure 5:
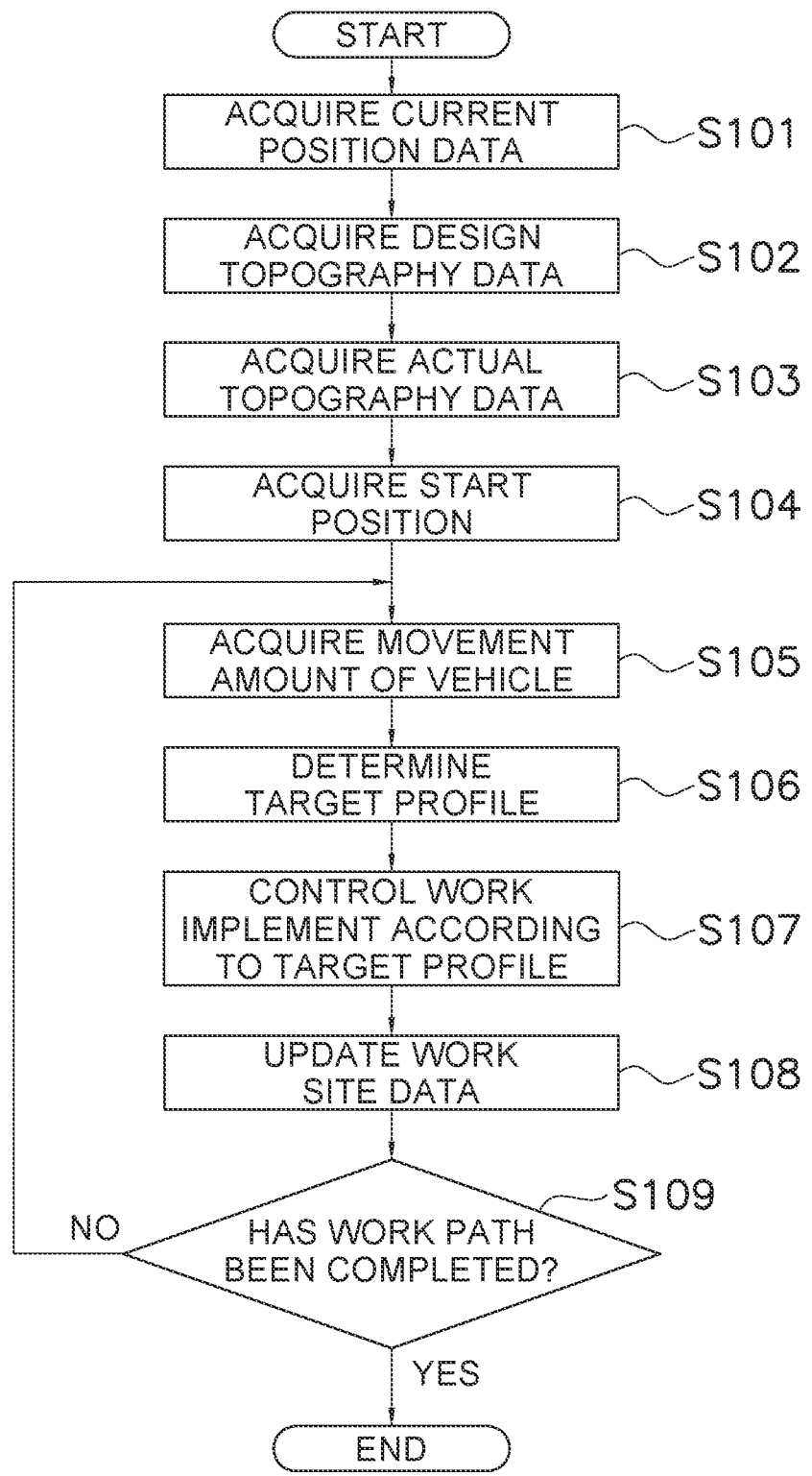
FIG. 5 is a flowchart illustrating processes of automatic control of a work implement.

The controller 26 automatically controls the work implement 13 based on the actual topography data, the design topography data, and the blade tip position data. The automatic control of the work implement 13 in digging executed by the controller 26 will be described below. FIG. 5 is a flowchart illustrating processes of the automatic control of the work implement 13 in digging work. FIG. 5 illustrates the processes in one work path in digging work. The one work path means steps from when the work machine 1 starts traveling forward from a start position and then performs a series of digging work until the work machine 1 starts traveling in reverse in order to move to a next start position.

As illustrated in FIG. 5, in step S101, the controller 26 acquires current position data. At this time, the controller 26 acquires the current blade tip position data of the blade 18 as the current position data as described above. In step S102, the controller 26 acquires the aforementioned design topography data. In step S103, the controller 26 acquires the aforementioned actual topography data.

In step S104, the controller 26 acquires a start position of work. For example, the controller 26 acquires, as the start position, the position when the blade tip position P0 first drops below the height Z0 of the actual topography 50. As a result, the position where the tip of the blade 18 is lowered and digging of the actual topography 50 is started is acquired as the start position. For example, the start position of work may be acquired when the work implement 13 is lowered by the operator operating the operating device 25a. Alternatively, the start position of work may be acquired when the work implement 13 is lowered by the controller 26 automatically controlling the work implement 13. However, the controller 26 may acquire the start position by another method. For example, the controller 26 may acquire the start position based on an operation of a button, a screen operation with a touch screen, or the like.

In step S105, the controller 26 acquires a movement amount of the work machine 1. The controller 26 acquires, as the movement amount, the distance that the work machine 1 travels from the start position to the current position. The movement amount of the work machine 1 may be the movement amount of the vehicle body 11. Alternatively, the movement amount of the work machine 1 may be the movement amount of the blade tip position P0 of the blade 18.

In step S106, the controller 26 determines a target profile 70. As illustrated in FIG. 4, the target profile 70 indicates a desired trajectory of the tip of the blade 18 in work. The target profile 70 is a target shape of the topography to be worked and indicates a desired shape as a result of digging work.

The controller 26 determines the target profile 70 so that the target profile 70 does not go below the final design topography 60. Therefore, the controller 26 determines the target profile 70 positioned at or above the final design topography 60 and below the actual topography 50 during digging work.

Figure 6:
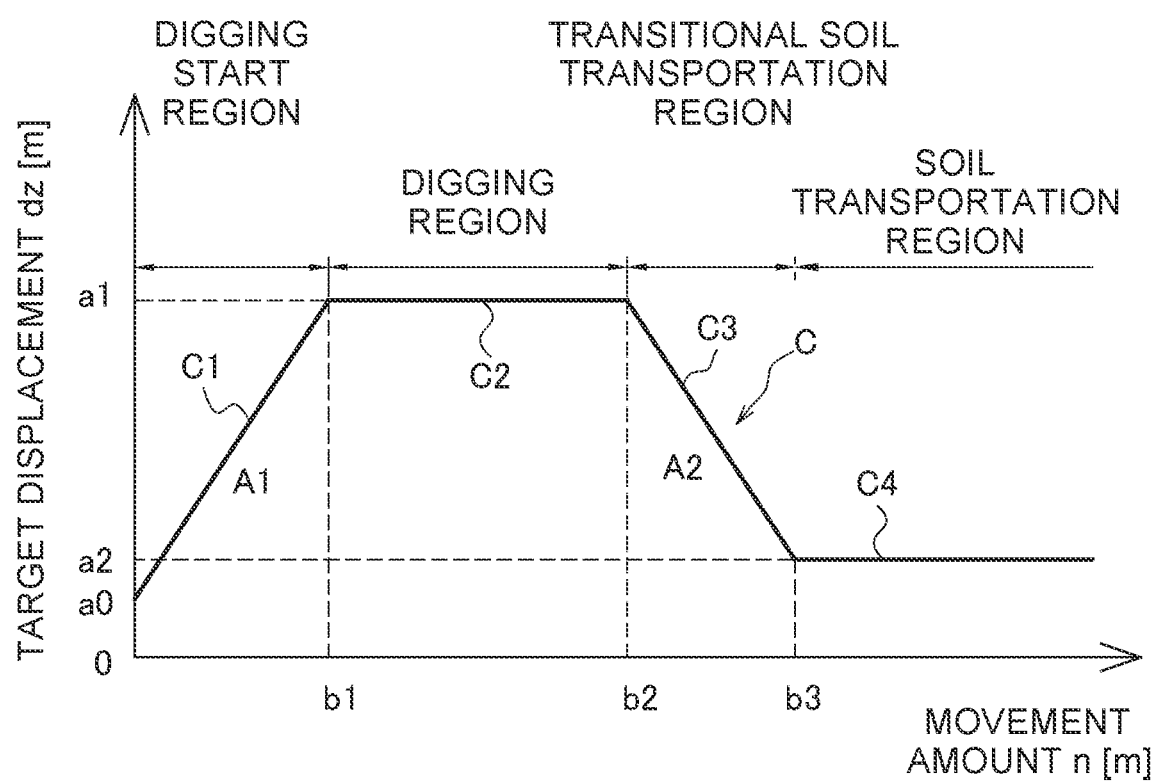
FIG. 6 is a graph illustrating an example of target displacement data.

As illustrated in FIG. 4, the controller 26 determines the target profile 70 that is displaced downward from the actual topography 50 by a target displacement dz. The target displacement dz is a target depth at each reference point in a vertical direction. Alternatively, the target displacement dz may be a target depth in a perpendicular direction of the actual topography 50. The controller 26 refers to target displacement data C to determine the target displacement dz according to the movement amount of the work machine 1. The target displacement data C is stored in the storage device 28. FIG. 6 is a graph illustrating an example of the target displacement data C. The target displacement data C defines the target displacement dz with respect to a movement amount n of the work machine 1 in the horizontal direction. The controller 26 refers to the target displacement data C illustrated in FIG. 6 to determine the target displacement dz from the movement amount n of the work machine 1.

The target displacement data C includes data at start C1, data during digging C2, data during transition C3, and data during soil transportation C4. The data at start C1 defines the relation between the movement amount n and the target displacement dz in a digging start region. The digging start region is a region where the movement amount n is from 0 to a value b1. As indicated by the data at start C1, the target displacement dz that gradually increases as the movement amount n increases is defined in the digging start region. The data at start C1 defines the target displacement dz that linearly increases to a first target value a1 with respect to the movement amount n. The data at start C1 includes an inclination A1. The inclination A1 is a ratio of a change amount of the target displacement dz with respect to a change amount of the movement amount n in the data at start C1. In the digging start region, the target displacement dz at a position where the movement amount n is 0, that is, at a start position of work, is a start value a0.

The data during digging C2 defines the relation between the movement amount n and the target displacement dz in a digging region. The digging region is a region where the movement amount n is from a value b1 to a value b2. As indicated by the data during digging C2, the data during digging C2 defines the target displacement dz that is constant with respect to the movement amount n. The target displacement dz in the digging region is constant at the first target value a1.

The data during transition C3 defines the relation between the movement amount n and the target displacement dz in a transitional soil transportation region. The transitional soil transportation region is a region where the movement amount n is from the value b2 to a value b3. As indicated by the data during transition C3, the target displacement dz that gradually decreases as the movement amount n increases is defined in the transitional soil transportation region. The data during transition C3 defines the target displacement dz that linearly decreases to a second target value a2 with respect to the movement amount n. The data during transition C3 includes an inclination A2. The inclination A2 is a ratio of a change amount of the target displacement dz with respect to a change amount of the movement amount n in the data during transition C3.

The data during soil transportation C4 defines the relation between the movement amount n and the target displacement dz in a soil transportation region. The soil transportation region is a region where the movement amount n is greater than or equal to the value b3. As indicated by the data during soil transportation C4, the target displacement dz is defined as a constant value in the soil transportation region. The target displacement dz in the soil transportation region is constant at the second target value a2. The second target value a2 is smaller than the first target value a1. Therefore, the target displacement dz defined in the digging region is larger than the target displacement dz in the soil transportation region.

The start value a0, the first target value a1, and the second target value a2 are constants and stored in the storage device 28. The start value a0 is preferably a small value at which the load applied to the blade at the digging start will not be excessively large. The first target value a1 is preferably a value at which the efficient digging according to the performance of the work machine 1 can be performed and the traveling resistance will not be excessively large. The second target value a2 is preferably set to a value suitable for the soil transportation work.

The inclinations A1 and A2 are constants and stored in the storage device 28. The inclination A1 in the data at start C1 is preferably a value at which a quick transition from the digging start to the digging work can be performed and the load applied to the blade 18 will not be excessively large. The inclination A2 in the data during transition C3 is preferably a value at which a quick transition from the digging work to the soil transportation work and the load applied to the blade 18 will not be excessively large.

The value b1 of the movement amount n when the digging region starts is calculated from the inclination A1, the start value a0, and the first target value a1. The value b2 of the movement amount n when the digging region ends is the movement amount when a current amount of soil held by the blade 18 exceeds a predetermined threshold. Therefore, the controller 26 decreases the target displacement dz from the first target value a1 when the current amount of soil held by the blade 18 has exceeded the predetermined threshold. The predetermined threshold is determined based, for example, on the maximum capacity of the blade 18. For example, the current amount of soil held by the blade 18 may be determined by measuring the load applied to the blade 18 and calculating from the load. Alternatively, the current amount of soil held by the blade 18 may be calculated by capturing an image of the blade 18 with a camera and analyzing the image. A predetermined initial value is set as the value b2. In a case where the amount of soil held by the blade 18 exceeds the predetermined threshold before reaching the value b2, the value b2 is updated to a value based on the movement amount when the amount of soil held by the blade 18 has exceeded the predetermined threshold, instead of the above initial value. The movement amount when the held soil amount has exceeded the predetermined threshold may be set as the updated value b2. A value smaller than the movement amount when the held soil amount has exceeded the predetermined threshold may be set as the updated value b2.

The value b3 of the movement amount n when the soil transportation region starts is calculated from the inclination A2 in the data during transition C3, the first target value a1, and the second target value a2. The values b1, b2, and b3 may be stored in storage device 28 as constants. The value b3 may be defined as b2+constant. When the value b2 is updated, the value b3 may be updated in conjunction with the value b2.

The controller 26 determines the target displacement dz according to the movement amount n from the target displacement data C. Then, the controller 26 determines a height Z of the target profile 70 (thick dashed line) illustrated in FIG. 4 from the height Z of the actual topography 50 and the target displacement dz.

Figure 7:
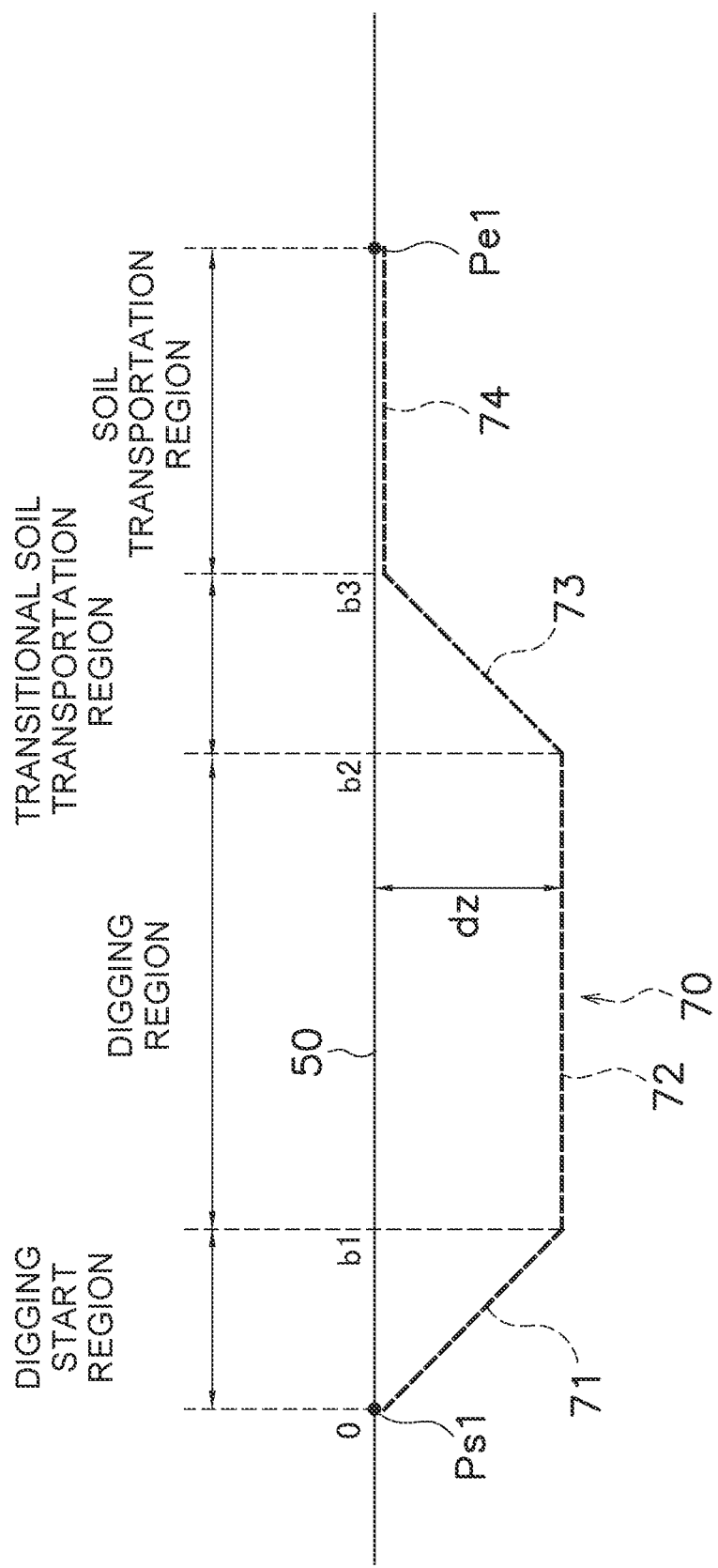
FIG. 7 is a graph illustrating the target profile generated from the target displacement data.

FIG. 7 is a graph illustrating an example of the target profile 70. The target profile 70 in FIG. 7 is an example of the target profile determined based on the target displacement data in FIG. 6 and the actual topography 50. In the example illustrated in FIG. 7, the work machine 1 starts work from a start position Ps1 and finishes the work at an end position Pe1. As illustrated in FIG. 7, the target profile 70 includes a first target surface 71, a second target surface 72, a third target surface 73, and a fourth target surface 74.

The first target surface 71 is the target profile in the digging start region. The controller 26 refers to the data at start C1 to determine the target displacement dz on the first target surface 71 from the movement amount. The first target surface 71 is inclined downward toward front of the work machine 1. The second target surface 72 is the target profile in the digging region. The controller 26 refers to the data during digging C2 to determine the target displacement dz on the second target surface 72 from the movement amount. The second target surface 72 is parallel to the actual topography 50. In the present embodiment, the second target surface 72 extends horizontally. The third target surface 73 is the target profile in the transitional soil transportation region. The controller 26 refers to the data during transition C3 to determine the target displacement dz on the third target surface 73 from the movement amount. The third target surface 73 is inclined upward toward front of the work machine 1. The fourth target surface 74 is the target profile in the soil transportation region. The controller refers to the data during soil transportation C4 to determine the target displacement dz on the fourth target surface 74 from the movement amount. The fourth target surface 74 is parallel to the actual topography 50. In the present embodiment, the fourth target surface 74 extends horizontally.

In step S107 illustrated in FIG. 5, the controller 26 controls the blade 18 according to the target profile 70. At this time, the controller 26 generates a command signal to the work implement 13 so that the blade tip position P0 of the blade 18 moves according to the target profile 70 determined in step S106. The generated command signal is input to the control valve 27. As a result, the blade tip position P0 of the work implement 13 moves along the target profile 70.

As illustrated in FIG. 7, in the digging region, the target displacement dz between the actual topography 50 and the target profile 70 is large in comparison with the other regions. Accordingly, the digging work of the actual topography 50 is performed in the digging region. In the soil transportation region, the target displacement dz between the actual topography 50 and the target profile 70 is small in comparison with the other regions. Accordingly, the digging of the ground surface is suppressed and the soil held by the blade 18 is transported in the transportation region.

In step S108, the controller 26 updates the work site data. The controller 26 acquires the position data indicative of the latest trajectory of the blade tip position P0 as the actual topography data and updates the work site data according to the acquired actual topography data. Alternatively, the controller 26 may calculate a position of the bottom surface of the crawler belts 16 from the vehicle body position data and the vehicle body dimension data and acquire the position data indicative of the actual trajectory of the bottom surface of the crawler belts 16 as the actual topography data. In this case, the update of the work site data can be performed instantly.

Alternatively, the actual topography data may be generated from survey data measured by a survey device outside of the work machine 1. For example, aerial laser survey may be used as an external survey device. Alternatively, the actual topography may be captured by a camera and the actual topography data may be generated from image data acquired by the camera. For example, aerial photographic survey using unmanned aerial vehicle (UAV) may be used. In the case of using the external survey device or camera, the work site data may be updated at a predetermined interval, or as appropriate.

In step S109, the controller 26 determines whether the current work path has been completed. The controller 26 determines that the current work path has been completed upon the work machine 1 reaching a predetermined work end position. For example, the controller 26 determines that the current work path has been completed upon determining that the blade tip position P0 reaches the end position Pe1 based on the actual position data. Alternatively, the controller 26 may determine that the current work path has been completed upon the work implement 13 being raised by the operator operating the operating device 25a. Alternatively, the controller 26 may determine that the current work path has been completed upon the work machine 1 being switched from the forward travel to the travel in reverse. When the current work path is not completed, the process returns to step S105.

Upon the current work path being completed, the work machine 1 travels in reverse on a straight route in order to move to a next start position. Then, the work machine 1 travels forward again to start a next work path. The switching between the forward travel and the reverse travel of the work machine 1 may be performed by the operator operating the operating device 25a. Alternatively, the switching between the forward travel and the reverse travel of the work machine 1 may be performed under the automatic control of the controller 26. The controller 26 also executes the above processes for the next work path. By repeating such processes, the digging is performed so that the actual topography 50 approaches the final design topography 60.

Figure 8:
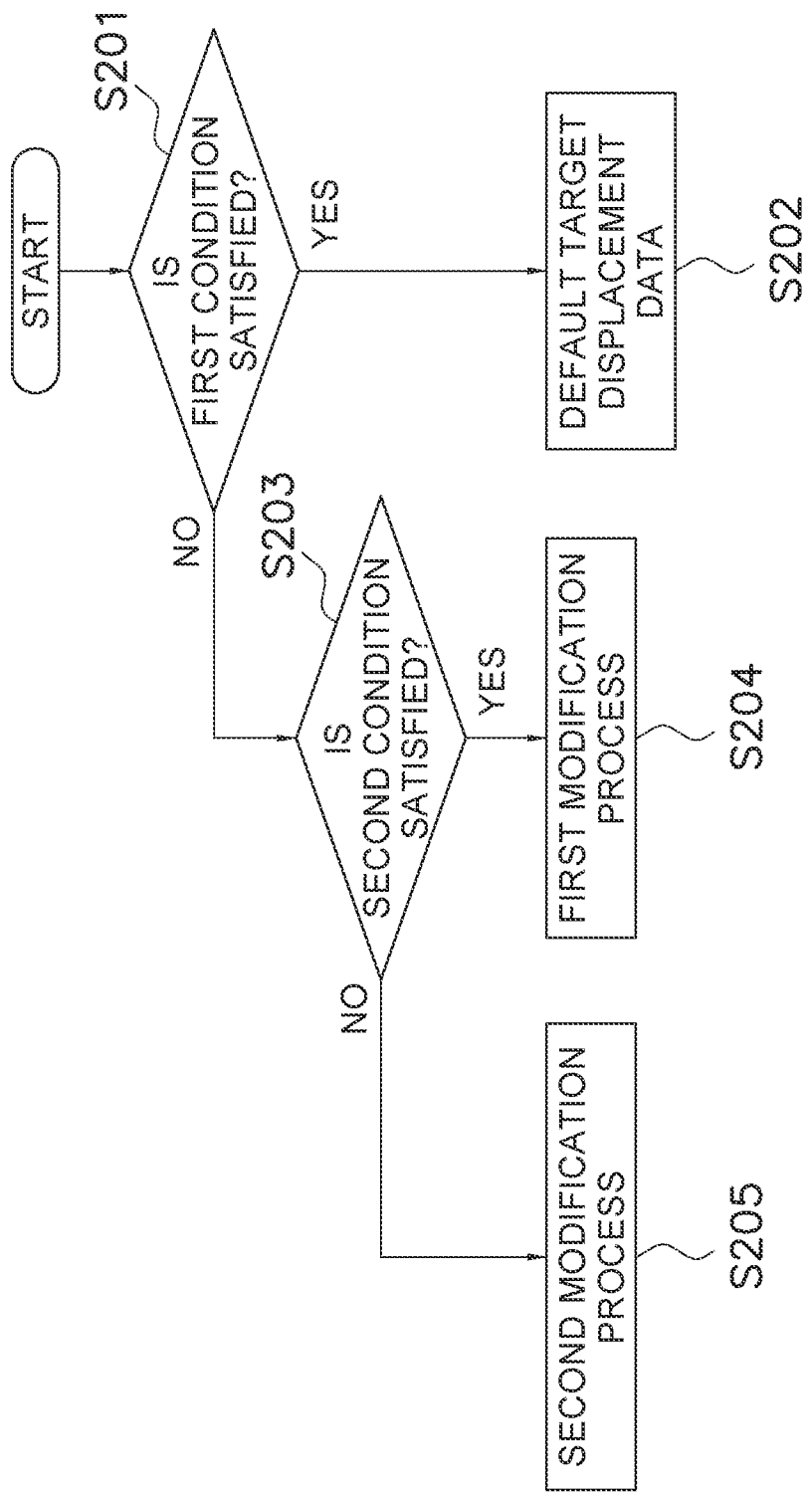
FIG. 8 is a flowchart illustrating processes for modifying the target displacement data.

The second and subsequent work paths may be affected by the topography resulting from the previous work path. Therefore, the controller 26 modifies the target displacement dz according to the distance between the start position of the previous work path and the start position of the current work path (hereinafter referred to as "work interval"). Specifically, the controller 26 modifies the target displacement data C according to the work interval, thereby modifying the target displacement dz according to the movement amount of the work machine 1. FIG. 8 is a flowchart illustrating processes for modifying the target displacement data C.

As illustrated in FIG. 8, in step S201, the controller 26 determines whether a first condition is satisfied. The first condition indicates that the current work path is not affected by the topography resulting from the previous work path or is less affected. The first condition includes that the current work path is a first work path. Also, the first condition includes that the work interval is larger than the value b2 that is the movement amount of a terminating end of the digging region.

When the first condition is satisfied, the process proceeds to step S202. In step S202, the controller 26 uses default target displacement data C. That is, the controller 26 refers to the aforementioned target displacement data C to determine the target displacement dz from the movement amount n of the work machine 1.

When the first condition is not satisfied in step S201, the process proceeds to step S203. In step S203, the controller 26 determines whether a second condition is satisfied. The second condition indicates that the current work path is affected by the topography resulting from the previous work path because the current start position is close to the previous start position. The second condition includes that the work interval is smaller than a first threshold. The first threshold is, for example, the same as the value b1 that is the movement amount of the terminating end of the digging start region. However, the first threshold may be different from the value b1.

Figure 9:
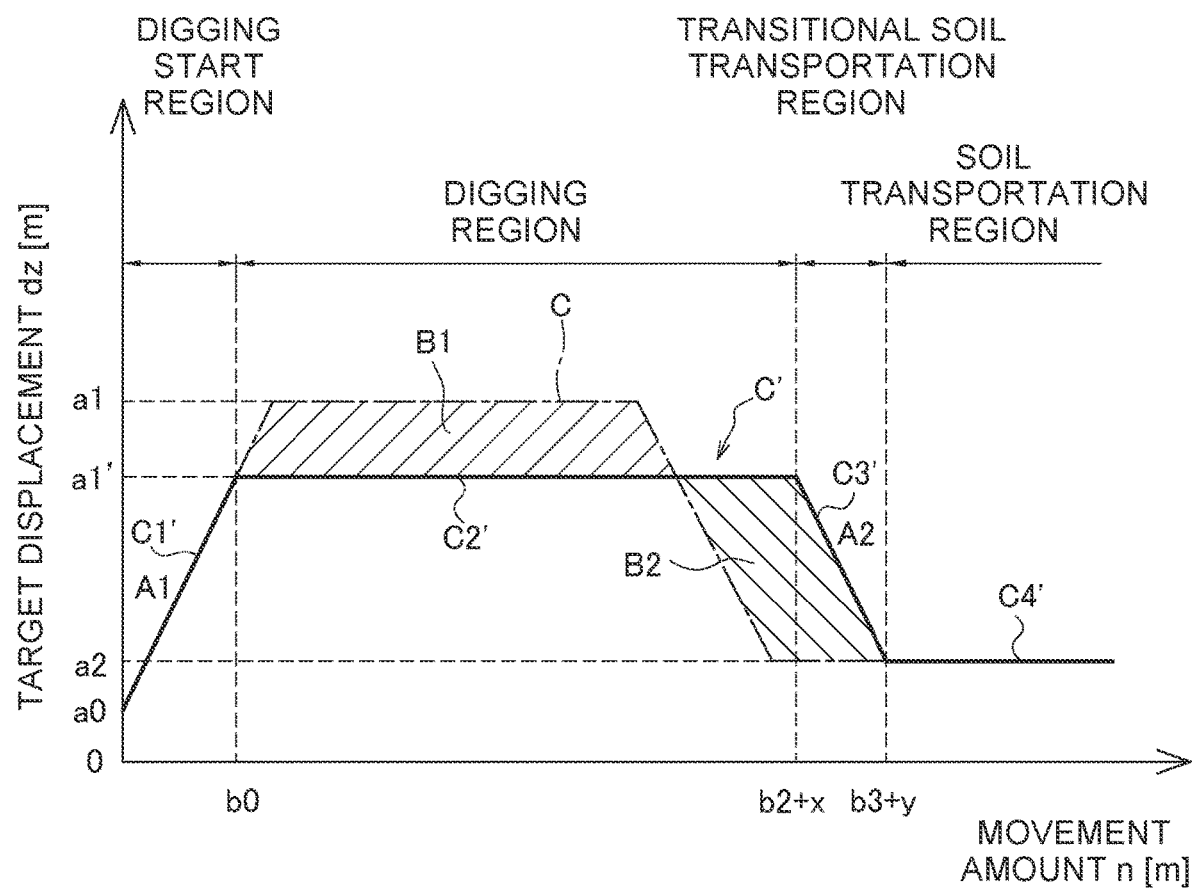
FIG. 9 is a graph illustrating an example of first modified data.
Figure 10:
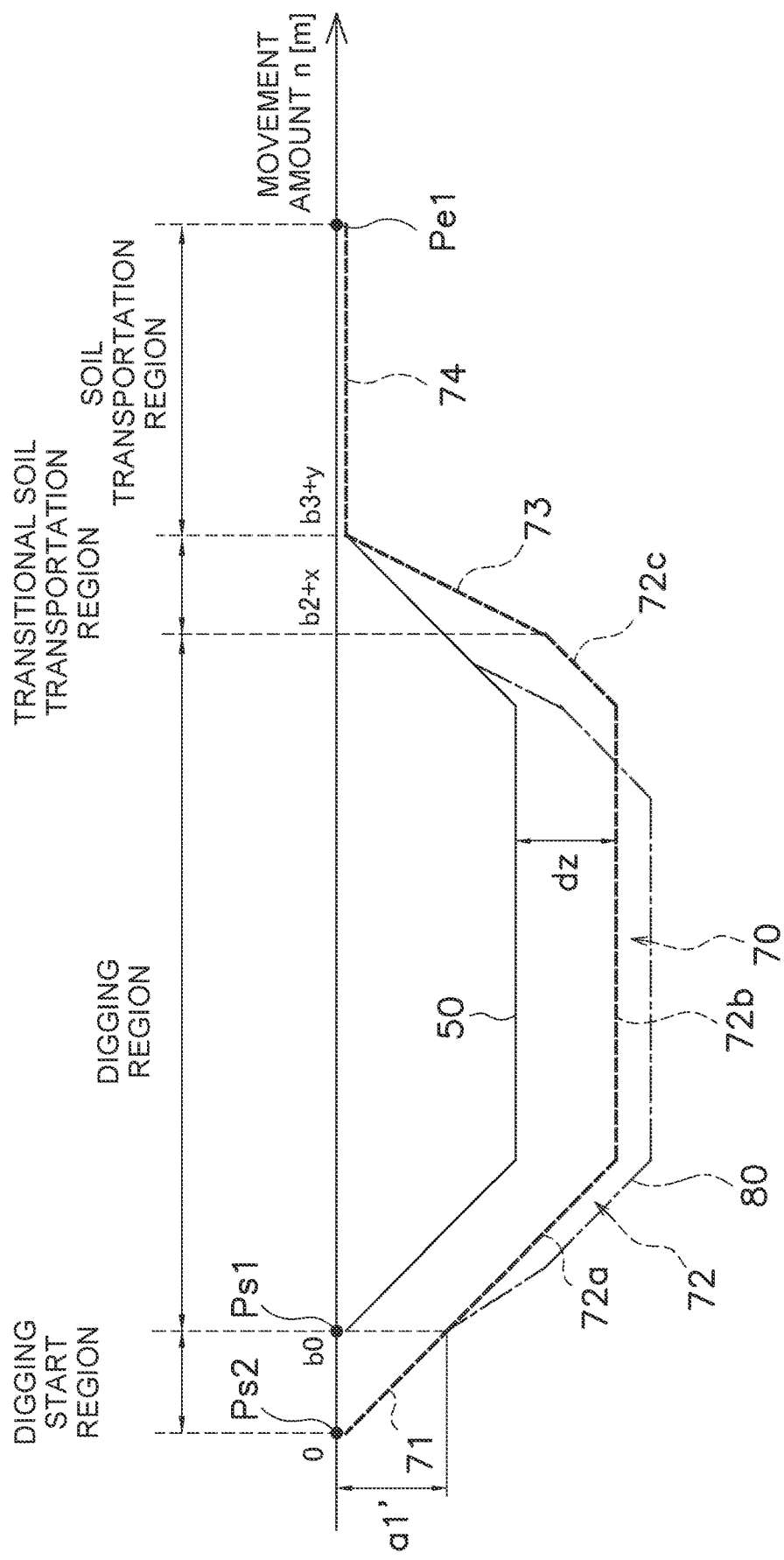
FIG. 10 is a graph illustrating the target profile generated from the first modified data.

When the second condition is satisfied, the process proceeds to step S204. In step S204, the controller 26 modifies the target displacement data C by a first modification process. FIG. 9 is a graph illustrating an example of data generated from the target displacement data C by the first modification process (hereinafter referred to as "first modified data C'"). FIG. 10 is a graph illustrating the target profile 70 generated from the first modified data C'.

As illustrated in FIG. 10, the actual topography 50 is the topography formed by the previous work path (hereinafter referred to as "first work path"). The first work path is not limited to the work path that is first performed on the actual topography 50. The first work path may be a second or subsequent work path performed on the actual topography 50.

In the first work path, the work is started from a first start position Ps1 and finished at a first end position Pe1. In the first work path, the controller 26 determines the target profile 70 by vertically displacing the actual topography 50 by the target displacement dz determined from the target displacement data C in the same way as illustrated in FIG. 7. Subsequently, the work machine 1 travels backward by the operation of the operator or the automatic control and starts a second work path from a second start position Ps2. The controller 26 acquires the second start position Ps2 and calculates a work interval b0 between the first start position Ps1 and the second start position Ps2. When the work interval b0 is smaller than the first threshold, the controller 26 modifies the target displacement data C to generate the first modified data C' illustrated in FIG. 9.

As illustrated in FIG. 9, the controller 26 modifies the target displacement data C so that a position where the movement amount n from the second start position Ps2 is the work interval b0 is a position of the terminating end of the digging start region in the second work path. The controller 26 changes the first target value from the value a1 to a value a1' without changing the inclination A1. The modified first target value a1' is smaller than the first target value a1 before modification.

As illustrated in FIG. 9, the digging start region is a region where the movement amount n is from 0 to the work interval b0 in the first modified data C'. Data at start C1' of the first modified data C' defines the target displacement dz that is the same as the target displacement dz in the target displacement data C, with respect to the movement amount n from 0 to the work interval b0. That is, in the data at start C1', the target displacement dz linearly increases to the modified first target value a1' at the inclination A1 with respect to the movement amount n from 0 to the work interval b0. The controller 26 calculates the modified first target value a1' from the start value a0, the inclination A1, and the work interval b0. As illustrated in FIG. 10, the controller 26 generates the first target surface 71 inclined downward in the region from the second start position Ps2 to the first start position Ps1 by the data at start C1'.

In the first modified data C', the digging region is a region where the movement amount n is from the work interval b0 to a value b2+x. Data during digging C2' of the first modified data C' defines the target displacement dz that is constant with respect to the movement amount n in the digging region. In the data during digging C2', the target displacement dz in the digging region is constant at the modified first target value a1'. The controller 26 generates the second target surface 72 in the digging region as indicated by the thick dashed line in FIG. 10 by the data during digging C2'. The second target surface 72 includes a first part 72a, a second part 72b, and a third part 72c. The first part 72a is positioned in front of the first target surface 71. The first part 72a is inclined downward. The inclination angle of the first part 72a is the same as that of the first target surface 71. The second part 72b extends horizontally. The third part 72c is positioned in front of the second part 72b. The third part 72c is inclined upward.

In FIG. 10, 80 indicates the target profile in the second work path determined by the unmodified target displacement data C. In a case where the second start position Ps2 is too close to the first start position Ps1, the inclination of the target profile 80 will suddenly increase at the point where the movement amount n is the work interval b0. On the other hand, with the control system 3 of the work machine 1 according to the present embodiment, in a case where the second start position Ps2 is too close to the first start position Ps1, the controller 26 determines the target profile 70 by the first modified data C'. Accordingly, the controller 26 can generate the first target surface 71 inclined at a constant angle and the first part 72a of the second target surface 72. This reduces the occurrence of increase in cutting angle in the digging region, thereby preventing the load applied to the blade from suddenly increasing.

In the first modified data C', the transitional soil transportation region is a region where the movement amount n is from the value b2+x to a value b3+y. Data during transition C3' of the first modified data C' defines the target displacement dz that linearly decreases at the inclination A2 with respect to the movement amount n from the value b2+x to the value b3+y.

As illustrated in FIG. 10, the controller 26 generates the third target surface 73 inclined upward in the transitional soil transportation region by the data during transition C3'. The controller 26 determines a value x and a value y so that the dug soil amount by the first modified data C' is equal to the dug soil amount by the target displacement data C. The dug soil amount by the first modified data C' is indicated by an area of the first modified data C' in FIG. 9. The dug soil amount by the target displacement data C is indicated by an area of the target displacement data C in FIG. 9. Therefore, the controller 26 determines the value x and the value y when the area of the first modified data C' and the area of the target displacement data C illustrated in FIG. 9 are to be the same in size. That is, the controller 26 determines the value x and the value y so that an area B1 and an area B2 that are hatched in FIG. 9 are the same in size. The controller 26 limits the maximum value of the value y to the work interval b0. This prevents the work machine 1 from digging ahead of the transitional soil transportation region of the first work path.

In the first modified data C', the soil transportation region is a region where the movement amount n is greater than or equal to the value b3+y. Data during soil transportation C4' of the first modified data C' defines the target displacement dz that is constant with respect to the movement amount n in the soil transportation region. In the data during soil transportation C4', the target displacement dz in the soil transportation region is constant at the second target value a2. As illustrated in FIG. 10, the controller 26 generates the fourth target surface 74 parallel to the actual topography 50 in the soil transportation region 10 by the data during soil transportation C4'.

When it is determined in step S203 that the second condition is not satisfied, the process proceeds to step S205. The fact that the second condition is not satisfied indicates that the current work path is affected by the topography resulting from the previous work path because the current start position is far from the previous start position. The controller 26 may execute the process in step S205 when a third condition is satisfied. The third condition may include that the work interval is greater than or equal to a second threshold. The second threshold may be equal to the first threshold. The second threshold may be greater than the first threshold. The second threshold may be greater than or equal to the value b1 that is the movement amount of the terminating end of the digging start region and smaller than the value b2 that is the movement amount of the terminating end of the digging region.

Figure 11:
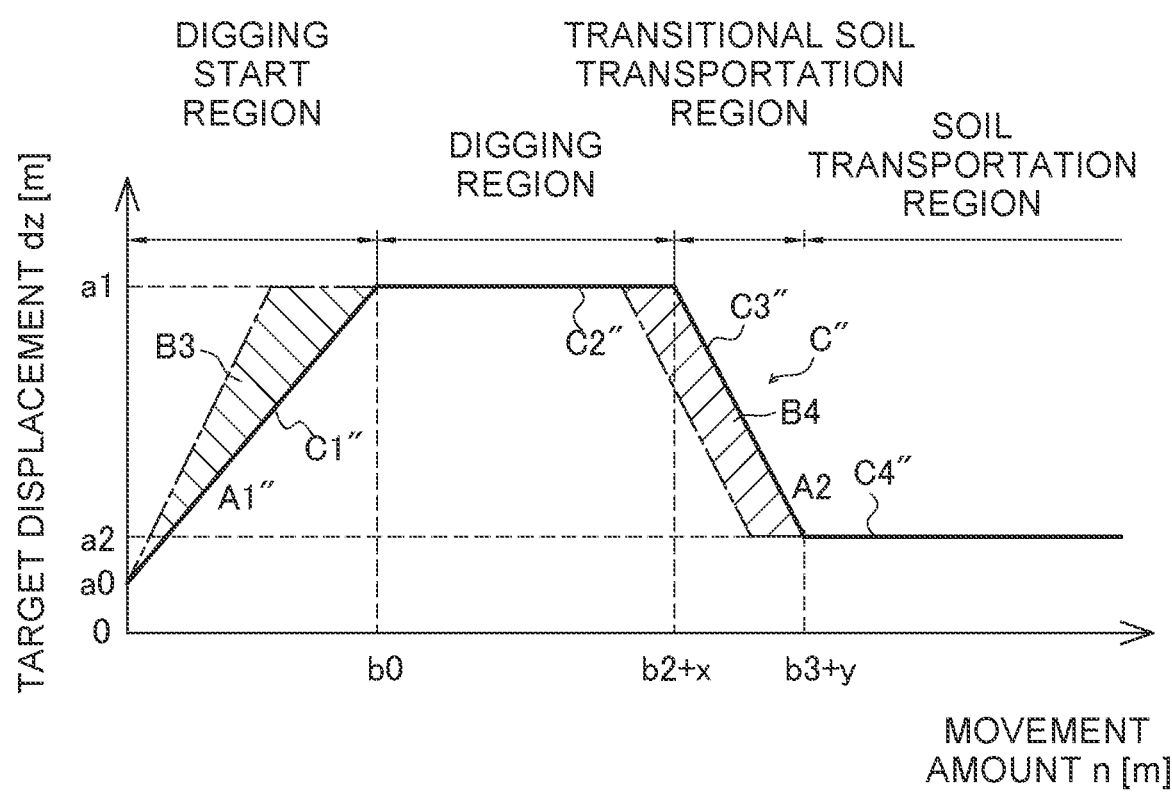
FIG. 11 is a graph illustrating an example of second modified data.
Figure 12:
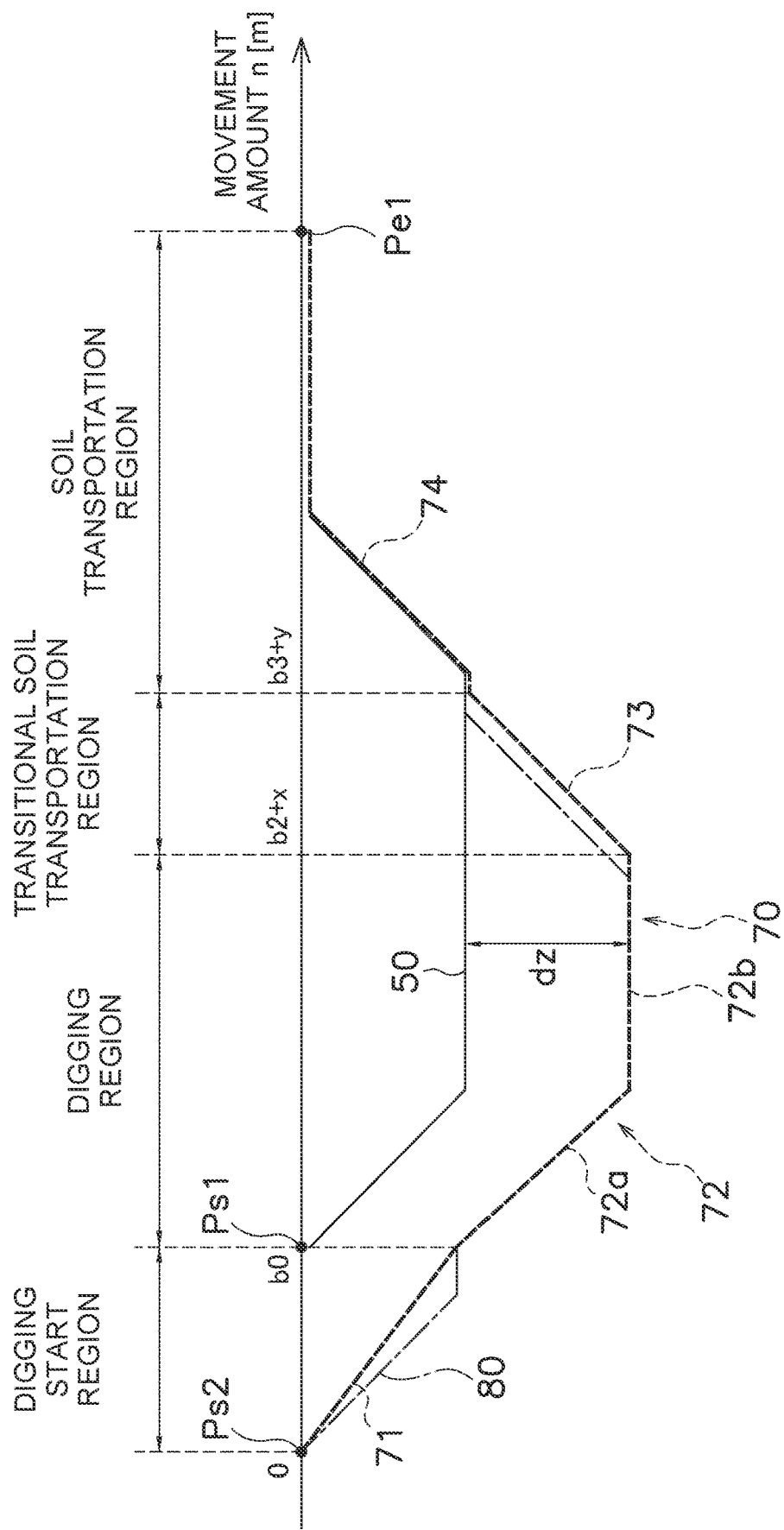
FIG. 12 is a graph illustrating the target profile generated from the second modified data.

In step S205, the controller 26 modifies the target displacement data C (chain line) by a second modification process. FIG. 11 is a graph illustrating an example of data generated from the target displacement data C by the second modification process (hereinafter referred to as "second modified data C'"). FIG. 12 is a graph illustrating the target profile 70 (thick dashed line) generated from the second modified data C".

As illustrated in FIG. 12, the controller 26 modifies the target displacement data C in the second work path so that the target displacement dz gradually increases from the second start position Ps2 to the first start position Ps1.

As illustrated in FIG. 11, in the second modified data C", the digging start region is a region where the movement amount n is from 0 to the work interval b0. Data at start C1" of the second modified data C" defines the target displacement dz that gradually increases with respect to the movement amount n from 0 to the work interval b0. That is, in the data at start C1", the target displacement dz linearly increases to the first target value a1 at a modified inclination A1" with respect to the movement amount n from 0 to the work interval b0. The modified inclination A1" is smaller than the inclination A1. The controller 26 calculates the modified inclination A1" from the start value a0, the first target value a1, and the work interval b0. As illustrated in FIG. 12, the controller 26 generates the first target surface 71 inclined downward in the region from the second start position Ps2 to the first start position Ps1 by the data at start C1". 80 indicated by the chain line is the target profile generated from the default target displacement data C. As indicated by the target profile 80, in a case where the second start position Ps2 is too far from the first start position Ps1, the digging start region ends and the digging region starts before the movement amount n has reached the work interval b0. As a result, the target profile 80 will have unevenness. On the other hand, with the control system 3 of the work machine 1 according to the present embodiment, in the case where the second start position Ps2 is too far from the first start position Ps1, the controller 26 determines the target profile 70 by the second modified data C". Accordingly, the controller 26 can reduce the variation in the inclination angle between the first target surface 71 and the first part 72a of the second target surface 72. This reduces the occurrence of unevenness, thereby preventing the load applied to the blade 18 from suddenly increasing.

In the second modified data C", the digging region is a region where the movement amount n is from the work interval b0 to the value b2+x. Data during digging C2" of the second modified data C" defines the target displacement dz that is constant with respect to the movement amount n in the digging region. In the data during digging C2", the target displacement dz in the digging region is constant at the first target value a1. As illustrated in FIG. 12, the controller 26 generates the second target surface 72 in the digging region by the data during digging C2". The second target surface 72 includes the first part 72a and the second part 72b. The first part 72a is positioned in front of the first target surface 71. The first part 72a is inclined downward. The inclination angle of the first part 72a is an angle corresponding to the inclination of the actual topography 50 formed by the first work path, and the inclination angle of the first target surface 71 is an angle corresponding to the inclination A1". However, the first target surface 71 and the first part 72a of the second target surface 72 are continuously connected without forming a horizontal part therebetween.

In the second modified data C", the transitional soil transportation region is a region where the movement amount n is from the value b2+x to the value b3+y. Data during transition C3" of the second modified data C" defines the target displacement dz that gradually decreases with respect to the movement amount n from the value b2+x to the value b3+y. In the data during transition C3", the target displacement dz linearly decreases to the second target value a2 at the inclination A2 with respect to the movement amount n from the value b2+x to the value b3+y.

As illustrated in FIG. 12, the controller 26 generates the third target surface 73 inclined upward in the transitional soil transportation region by the data during transition C3". The controller 26 determines the value x and the value y when the dug soil amount by the second modified data C" and the dug soil amount by the target displacement data C are to be equal to each other. That is, the controller 26 determines the value x and the value y so that an area B3 and an area B4 that are hatched in FIG. 11 are the same in size.

In the second modified data C", the soil transportation region is a region where the movement amount n is greater than or equal to the value b3+y. Data during soil transportation C4" of the second modified data C" defines the target displacement dz that is constant with respect to the movement amount n in the soil transportation region. In the data during soil transportation C4", the target displacement dz in the soil transportation region is constant at the second target value a2. As illustrated in FIG. 12, the controller 26 generates the fourth target surface 74 parallel to the actual topography 50 in the soil transportation region by the data during soil transportation C4". Unevenness is formed from a terminating end of the transitional soil transportation region in FIG. 12. Since the unevenness in the transitional soil transportation region and thereafter does not lead to a sudden increase in the load applied to the blade, the unevenness may be inevitably formed in the present embodiment. However, the value y may be determined so that unevenness is not formed.

The aforementioned processes illustrated in FIG. 8 are repeated in a third work path. In the third work path, the distance between a third start position of the third work path and the aforementioned second start position is used as the work interval. The controller 26 modifies the target displacement data C according to the work interval to generate the first modified data C' or the second modified data C". The controller 26 refers to the first modified data C' or the second modified data C" to determine the target displacement dz according to the movement amount from the third start position. The controller 26 determines a topography in which the actual topography 50 is vertically displaced downward by the target displacement dz as the target profile 70 in the third work path. The controller 26 repeats the same processes for a fourth and subsequent work paths.

With the control system 3 of the work machine 1 according to the present embodiment as described above, in the first work path, the target displacement dz (first target displacement) according to the movement amount is determined with reference to the default target displacement data C. Then, the topography in which the actual topography 50 is vertically displaced downward by the target displacement dz is determined as the target profile 70 in the first work path. In a case where the work interval between the first work path and the second work path is less than or equal to the value b2, the first modified data C' or the second modified data C" in which the default target displacement data C is modified is generated according to the work interval. The target displacement dz (second target displacement) is determined with reference to the modified data C', C". Then, the topography in which the actual topography 50 is vertically displaced downward by the target displacement dz is determined as the target profile 70 in the second work path. Therefore, the target profile 70 in the second work path is determined in consideration of the topography resulting from the first work path. As a result, it is possible to reduce the influence of the topography resulting from the previous work path and improve work quality or work efficiency.

Although one embodiment of the present invention has been described above, the present invention is not limited to the above embodiment and various modifications may be made without departing from the gist of the invention.

The work machine 1 is not limited to a bulldozer and may be another vehicle such as a wheel loader, a motor grader, or the like.

The work machine 1 may be a vehicle that can be remotely controlled. In this case, a portion of the control system 3 may be disposed outside of the work machine 1. For example, the controller 26 may be disposed outside of the work machine 1. The controller 26 may be disposed in a control center that is away from the work site.

Figure 13:
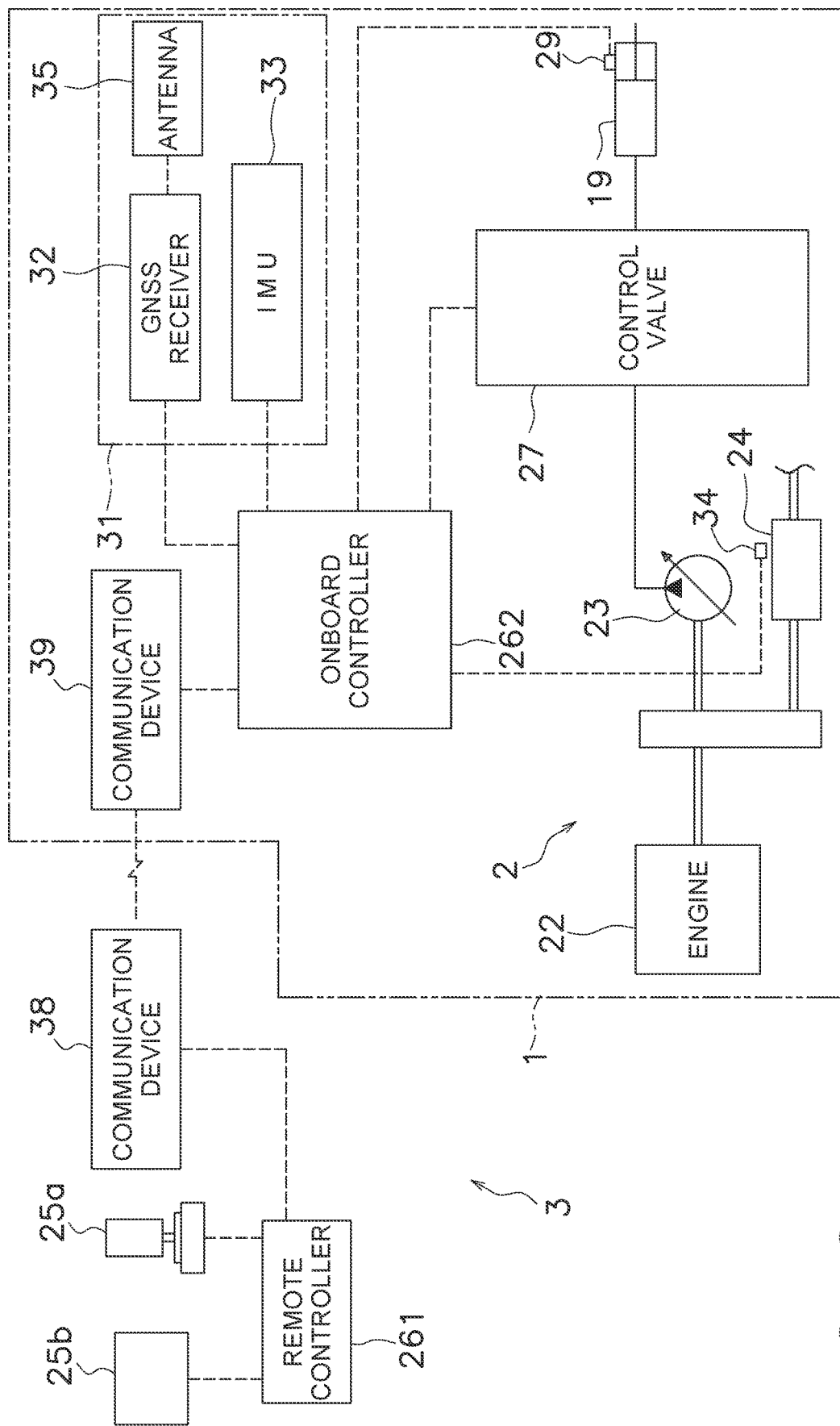
FIG. 13 is a block diagram illustrating the configuration of the drive system and the control system of the work machine according to a modified example.

The controller 26 may have a plurality of controllers that are separate from each other. For example, as illustrated in FIG. 13, the controller 26 may include a remote controller 261 disposed outside of the work machine 1 and an onboard controller 262 mounted on the work machine 1. The remote controller 261 and the onboard controller 262 may be able to wirelessly communicate with each other via communication devices 38 and 39. A portion of the aforementioned functions of the controller 26 may be executed by the remote controller 261 and the remaining functions may be executed by the onboard controller 262. For example, the processes for determining the target profile 70 may be executed by the remote controller 261 and the processes for outputting the command signal to the work implement 13 may be executed by the onboard controller 262.

The operating device 25a and the input device 25b may be disposed outside of the work machine 1. In this case, the operating cabin may be omitted from the work machine 1. Alternatively, the operating device 25a and the input device 25b may be omitted from the work machine 1. The work machine 1 may be operated with only the automatic control by the controller 26 without operations by the operating device 25a.

Figure 14:
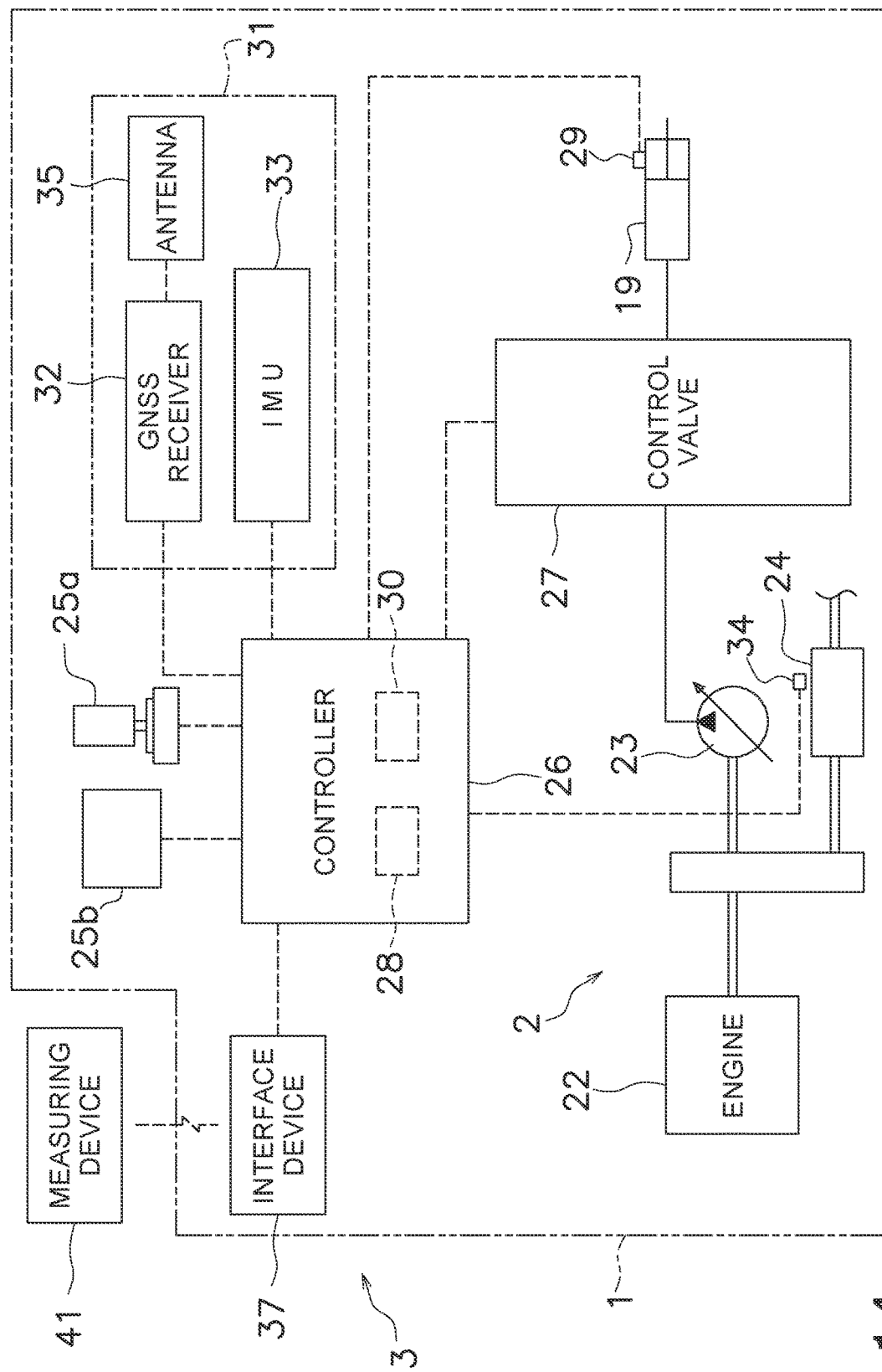
FIG. 14 is a block diagram illustrating the configuration of the drive system and the control system of the work machine according to another modified example.

The actual topography 50 may be acquired by another device, instead of the aforementioned position sensor 31. For example, as illustrated in FIG. 14, the actual topography 50 may be acquired by an interface device 37 that receives data from an external device. The interface device 37 may wirelessly receive the actual topography data measured by a measuring device 41 disposed outside. Alternatively, the interface device 37 may be a recording medium reading device and may receive the actual topography data measured by the external measuring device 41 via the recording medium.

The processes by the controller 26 are not limited to those of the above embodiment and may be changed. A portion of the aforementioned processes may be omitted. Alternatively, a portion of the aforementioned processes may be changed. For example, the processes for determining the target profile 70 may be changed.

Figure 15:
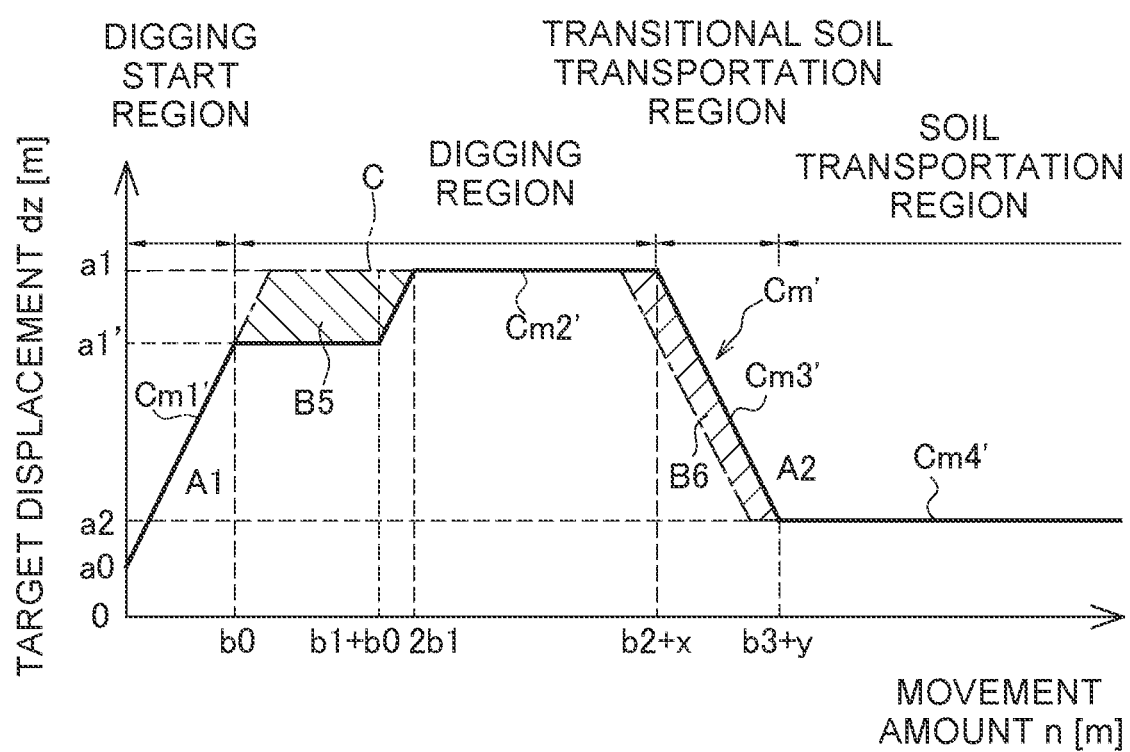
FIG. 15 is a graph illustrating an example of the first modified data according to a modified example.

FIG. 15 is a graph illustrating first modified data Cm' according to a modified example. As illustrated in FIG. 15, in the first modified data Cm' according to the modified example, the digging start region is a region where the movement amount n is from 0 to the work interval b0. Data at start Cm1' of the first modified data Cm' defines the target displacement dz that is the same as the target displacement dz in the target displacement data C, with respect to the movement amount n from 0 to the work interval b0. That is, in the data at start Cm1', the target displacement dz linearly increases to the modified first target value a1' at the inclination A1 with respect to the movement amount n from 0 to the work interval b0.

Figure 16:
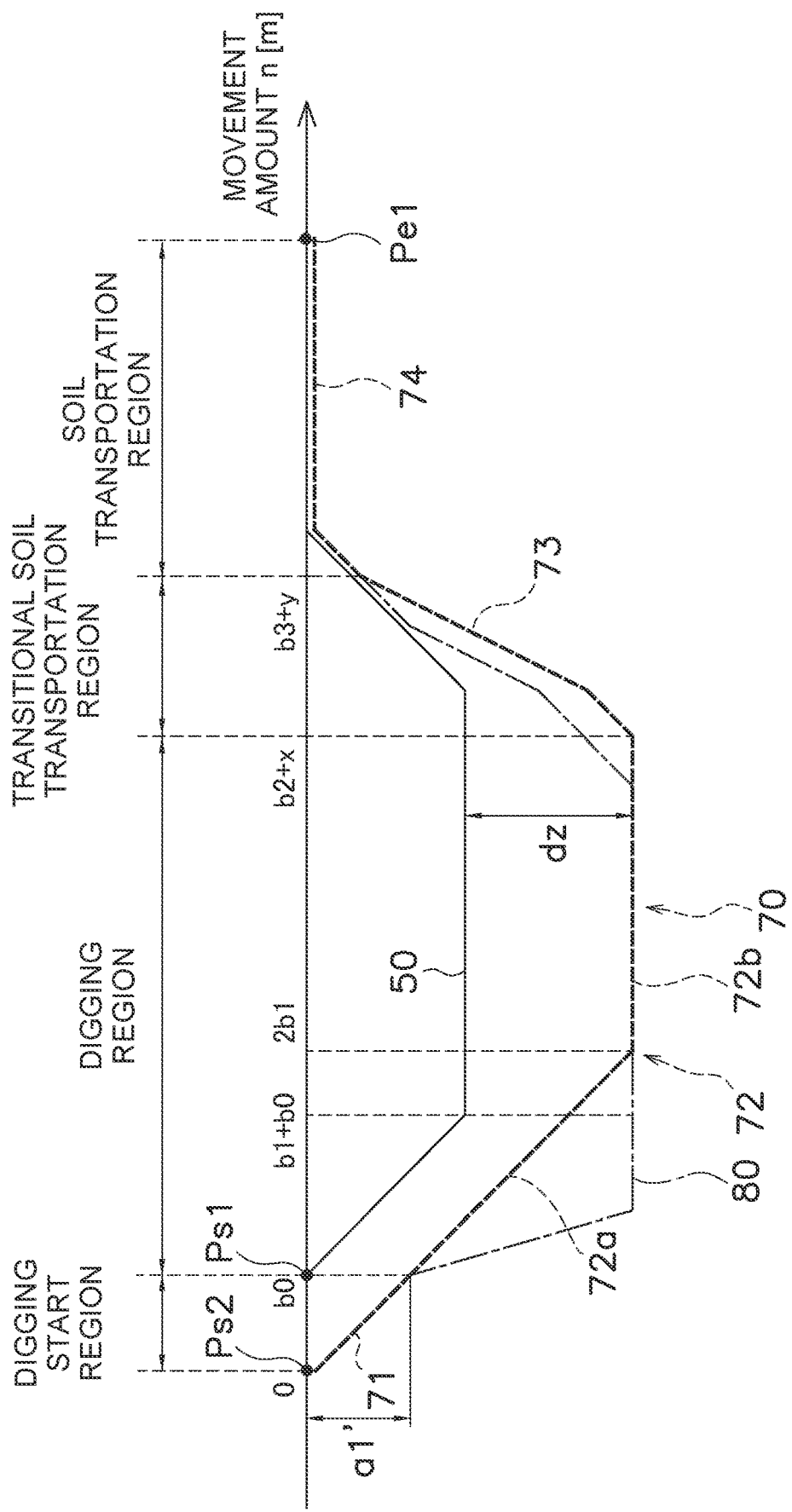
FIG. 16 is a graph illustrating the target profile generated from the first modified data according to the modified example.

In the first modified data Cm', the digging region is a region where the movement amount n is from the work interval b0 to the value b2+x. Data during digging Cm2' of the first modified data Cm' defines the target displacement dz that is constant at the modified first target value a1' with respect to the movement amount n from the work interval b0 to a value b1+b0. Further, the data during digging Cm2' defines the target displacement dz that linearly increases to the first target value a1 at the inclination A1 with respect to the movement amount n from the value b1+b0 to a value 2b1. The data during digging Cm2' defines the target displacement dz that is constant at the first target value a1 with respect to the movement amount n from the value 2b1 to the value b2+x. As illustrated in FIG. 16, the controller 26 generates the first target surface 71 inclined downward in the region from the second start position Ps2 to the first start position Ps1 by the data at start Cm1'. As illustrated in FIG. 16, the controller 26 generates the second target surface 72 in the digging region by the data during digging Cm2'. The second target surface 72 includes the first part 72a and the second part 72b. The first part 72a is positioned in front of the first target surface 71. The first part 72a is inclined downward. The inclination angle of the first part 72a is the same as that of the first target surface 71. The second part 72b extends horizontally.

In the first modified data Cm', the transitional soil transportation region is a region where the movement amount n is from the value b2+x to the value b3+y. Data during transition Cm3' of the first modified data Cm' defines the target displacement dz that linearly decreases at the inclination A2 with respect to the movement amount n from the value b2+x to the value b3+y.

As illustrated in FIG. 16, the controller 26 generates the third target surface 73 inclined upward in the transitional soil transportation region by the data during transition Cm3'. The controller 26 determines the value x and the value y so that the dug soil amount by the first modified data Cm' is equal to the dug soil amount by the target displacement data C. That is, the controller 26 determines the value x and the value y so that an area B5 and an area B6 that are hatched in FIG. 15 are the same in size.

In the first modified data Cm', the soil transportation region is a region where the movement amount n is greater than or equal to the value b3+y. Data during soil transportation Cm4' of the first modified data Cm' defines the target displacement dz that is constant with respect to the movement amount n in the soil transportation region. In the data during soil transportation Cm4', the target displacement dz in the soil transportation region is constant at the second target value a2. As illustrated in FIG. 16, the controller 26 generates the fourth target surface 74 parallel to the actual topography 50 in the soil transportation region by the data during soil transportation Cm4'.

Figure 17:
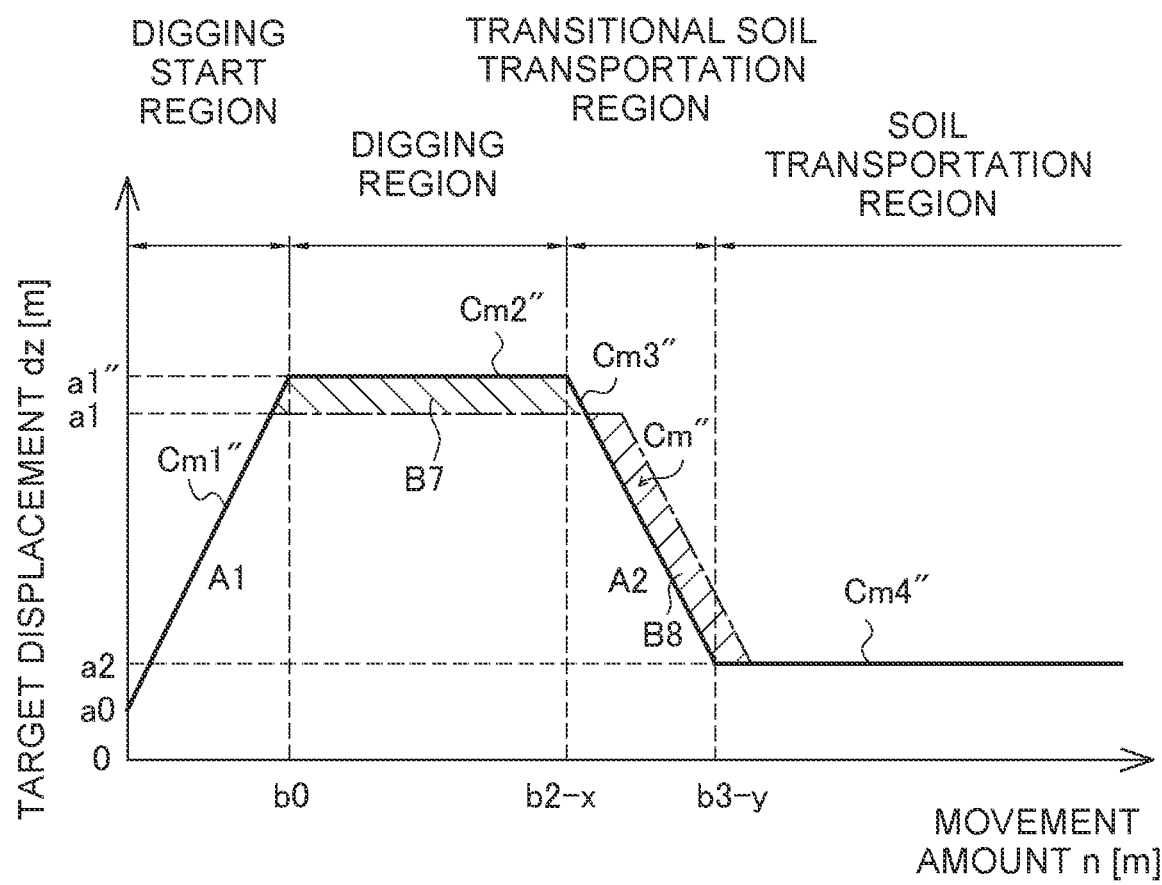
FIG. 17 is a graph illustrating an example of the second modified data according to a modified example.

FIG. 17 is a graph illustrating second modified data Cm" according to a modified example. As illustrated in FIG. 17, in the second modified data Cm", the digging start region is a region where the movement amount n is from 0 to the work interval b0. Data at start Cm1" of the second modified data Cm" defines the target displacement dz that gradually increases with respect to the movement amount n from 0 to the work interval b0. That is, in the data at start Cm1", the target displacement dz linearly increases to a modified first target value a1" at the inclination A1 with respect to the movement amount n from 0 to the work interval b0.

Figure 18:
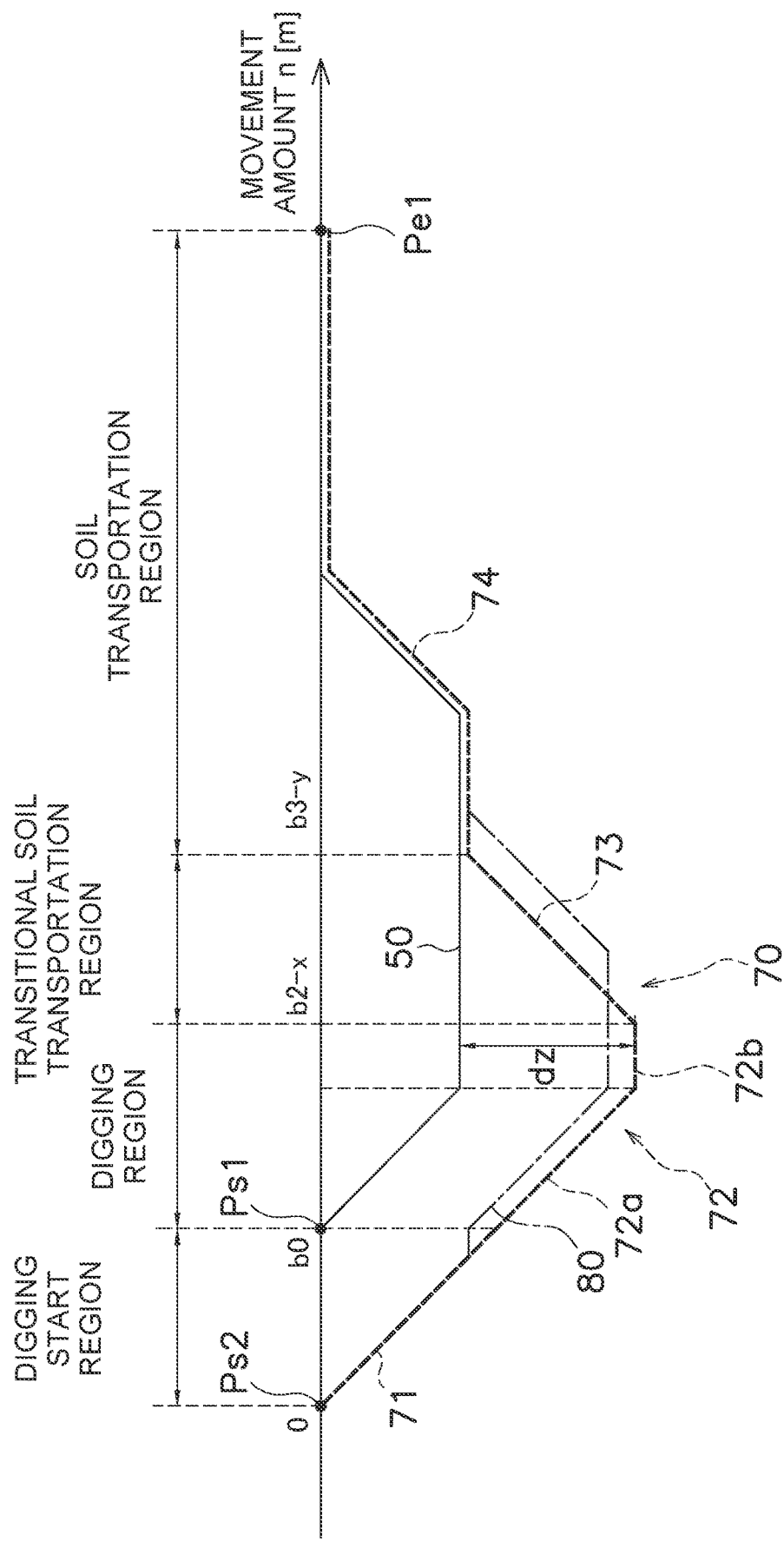
FIG. 18 is a graph illustrating the target profile generated from the second modified data according to the modified example.

The modified first target value a1" is larger than the first target value a1. The controller 26 calculates the modified first target value a1" from the start value a0, the inclination A1, and the work interval b0. As illustrated in FIG. 18, the controller 26 generates the first target surface 71 inclined downward in the region from the second start position Ps2 to the first start position Ps1 by the data at start Cm1".

In the second modified data Cm", the digging region is a region where the movement amount n is from the value b0 to a value b2−x. Data during digging Cm2" of the second modified data Cm" defines the target displacement dz that is constant with respect to the movement amount n in the digging region. In the data during digging Cm2", the target displacement dz in the digging region is constant at the modified first target value a1". As illustrated in FIG. 18, the controller 26 generates the second target surface 72 in the digging region by the data during digging Cm2″. The second target surface 72 includes the first part 72a and the second part 72b. The first part 72a is positioned in front of the first target surface 71. The first part 72a is inclined downward. The inclination angle of the first part 72a is the same as that of the first target surface 71. The first target surface 71 and the first part 72a of the second target surface 72 are continuously connected without forming a horizontal part therebetween.

In the second modified data Cm″, the transitional soil transportation region is a region where the movement amount n is from the value b2-x to a value b3-y. Data during transition Cm3″ of the second modified data Cm″ defines the target displacement dz that gradually decreases with respect to the movement amount n from the value b2-x to the value b3-y. In the data during transition Cm3″, the target displacement dz linearly decreases at the inclination A2 with respect to the movement amount n from the value b2-x to the value b3-y.

As illustrated in FIG. 18, the controller 26 generates the third target surface 73 inclined upward in the transitional soil transportation region by the data during transition Cm3″. The controller 26 determines the value x and the value y so that the dug soil amount by the second modified data Cm″ is equal to the dug soil amount by the target displacement data C. That is, the controller 26 determines the value x and the value y so that an area B7 and an area B8 that are hatched in FIG. 17 are the same in size.

In the second modified data Cm″, the soil transportation region is a region where the movement amount n is greater than or equal to the value b3-y. Data during soil transportation Cm4″ of the second modified data Cm″ defines the target displacement dz that is constant with respect to the movement amount n in the soil transportation region. In the data during soil transportation Cm4″, the target displacement dz in the soil transportation region is constant at the second target value a2. As illustrated in FIG. 18, the controller 26 generates the fourth target surface 74 parallel to the actual topography 50 in the soil transportation region by the data during soil transportation Cm4″.

The method for determining the value x and the value y may be different from that as described above. The dug soil amount by the first modified data C′ may be different from the dug soil amount by the target displacement data C. The dug soil amount by the second modified data C″ may be different from the dug soil amount by the target displacement data C. The shape of the target displacement data C may be different from that as described above.

According to the present disclosure, it is possible to reduce an influence of the topography resulting from the previous work path and improve work quality or work efficiency.

The invention claimed is:

1. A system for controlling a work machine including a work implement, the system comprising:
 a sensor configured to detect a current position of the work machine; and
 a controller configured to communicate with the sensor, the controller being configured to
  acquire current position data indicative of the current position of the work machine,
  acquire actual topography data indicative of an actual topography,
  acquire default target displacement data that defines a target displacement according to a movement amount of the work machine in a movement direction of the work machine,
  acquire a work interval indicative of a distance between a previous start position of work by the work machine and a current start position positioned rearward of the previous start position with respect to the movement direction,
  generate modified data in which the default target displacement data is modified according to the work interval,
  refer to the modified data to determine the target displacement according to the movement amount of the work machine from the current start position,
  determine topography data in which the actual topography data is vertically displaced downward by the target displacement as a target profile, and
  move the work implement according to the target profile.

2. The system according to claim 1, wherein
the controller is configured to generate the modified data when the work interval exceeds a predetermined threshold.

3. The system according to claim 2, wherein
the controller is configured to generate the modified data when the work interval is smaller than a first threshold.

4. The system according to claim 2, wherein
the controller is configured to generate the modified data when the work interval is larger than a second threshold.

5. The system according to claim 1, wherein
the controller is configured to
 receive a signal indicative of an operation of an operating device of the work implement by an operator, and
 determine the previous start position and the current start position based on the operation of the operating device.

6. The system according to claim 1, wherein
the controller is configured to
 acquire a first start position of work by the work machine as the previous start position,
 acquire a movement amount of the work machine from the first start position from the current position data,
 refer to the default target displacement data to determine the target displacement according to the movement amount from the first start position as a first target displacement,
 determine topography data in which the actual topography data is vertically displaced downward by the first target displacement as a first target profile,
 move the work implement according to the first target profile,
 acquire a second start position positioned behind the first start position as the current start position,
 generate the modified data in which the default target displacement data is modified according to a first work interval indicative of a distance between the first start position and the second start position,
 acquire a movement amount of the work machine from the second start position from the current position data,
 refer to the modified data to determine the target displacement according to the movement amount of the work machine from the second start position as a second target displacement, determine topography data in which the actual topography data is vertically displaced downward by the second target displacement as a second target profile, and move the work implement according to the second target profile.

7. The system according to claim 6, wherein the default target displacement data includes
a digging start region in which the target displacement increases as the movement amount increases, and
a digging region in which the target displacement is constant with respect to an increase in the movement amount, the digging region being positioned beyond the digging start region in the movement direction of the work machine.

8. The system according to claim 7, wherein the controller is configured to modify the default target displacement data so that a terminating end position of the digging start region in the modified data is a position where the movement amount from the second start position is equal to the work interval.

9. The system according to claim 7, wherein the controller is configured to modify the default target displacement data so that a terminating end position of the digging start region in the modified data is a position where the movement amount from the second start position is equal to the work interval when the work interval is smaller than a first threshold.

10. The system according to claim 9, wherein the first threshold is a value determined based on the movement amount to the terminating end of the digging start region in the default target displacement data.

11. The system according to claim 7, wherein the controller is configured to modify the default target displacement data so that a terminating end position of the digging start region in the modified data is a position where the movement amount from the second start position is equal to the work interval when the work interval is larger than a second threshold.

12. The system according to claim 11, wherein the second threshold is a value determined based on the movement amount to the terminating end of the digging start region in the default target displacement data.

13. The system according to claim 7, wherein the controller is configured to refer to the default target displacement data to determine the target displacement according to the movement amount from the second start position as a second target displacement when the work interval is larger than a third threshold, and
the third threshold is a value determined based on the movement amount to a terminating end of the digging region.

14. The system according to claim 6, wherein the controller is configured to modify the default target displacement data so that a dug soil amount by the modified data is equal to a dug soil amount by the default target displacement data.

15. A method for controlling a work machine including a work implement, the method comprising:
acquiring current position data indicative of a current position of the work machine;
acquiring actual topography data indicative of an actual topography;
acquiring default target displacement data that defines a target displacement according to a movement amount of the work machine in a movement direction of the work machine;
acquiring a work interval indicative of a distance between a previous start position of work by the work machine and a current start position positioned rearward of the previous start position with respect to the movement direction;
generating modified data in which the default target displacement data is modified according to the work interval;
referring to the modified data to determine the target displacement according to the movement amount of the work machine from the current start position;
determining a topography in which the actual topography data is vertically displaced downward by the target displacement as a target profile; and
moving the work implement according to the target profile.

16. A work machine comprising:
a work implement;
a sensor configured to detect a current position of the work machine; and
a controller configured to communicate with the sensor, the controller being configured to
acquire current position data indicative of the current position of the work machine,
acquire actual topography data indicative of an actual topography,
acquire default target displacement data that defines a target displacement according to a movement amount of the work machine in a movement direction of the work machine,
acquire a work interval indicative of a distance between a previous start position of work by the work machine and a current start position positioned rearward the previous start position with respect to the movement direction,
generate modified data in which the default target displacement data is modified according to the work interval,
refer to the modified data to determine the target displacement according to the movement amount of the work machine from the current start position,
determine topography data in which the actual topography data is vertically displaced downward by the target displacement as a target profile, and
move the work implement according to the target profile.

* * * * *